US008935717B2

(12) United States Patent
Jarman

(10) Patent No.: US 8,935,717 B2
(45) Date of Patent: Jan. 13, 2015

(54) APPARATUS AND METHOD FOR BLOCKING AUDIO/VISUAL PROGRAMMING AND FOR MUTING AUDIO

(75) Inventor: Matthew T. Jarman, Salt Lake City, UT (US)

(73) Assignee: Clearplay, Inc., Salt Lake City, UT (US)

( * ) Notice: Subject to any disclaimer, the term of this patent is extended or adjusted under 35 U.S.C. 154(b) by 2331 days.

(21) Appl. No.: 10/971,899

(22) Filed: Oct. 22, 2004

(65) Prior Publication Data

US 2006/0277564 A1 Dec. 7, 2006

Related U.S. Application Data

(60) Provisional application No. 60/481,544, filed on Oct. 22, 2003, provisional application No. 60/481,548, filed on Oct. 23, 2003.

(51) Int. Cl.
| | |
|---|---|
| H04N 7/10 | (2006.01) |
| H04N 21/84 | (2011.01) |
| H04N 21/258 | (2011.01) |
| H04N 21/439 | (2011.01) |
| H04N 21/45 | (2011.01) |
| H04N 21/454 | (2011.01) |
| H04N 21/475 | (2011.01) |
| H04N 21/482 | (2011.01) |
| H04N 21/658 | (2011.01) |

(52) U.S. Cl.
CPC ......... *H04N 21/84* (2013.01); *H04N 21/25891* (2013.01); *H04N 21/4396* (2013.01); *H04N 21/4532* (2013.01); *H04N 21/4542* (2013.01); *H04N 21/4755* (2013.01); *H04N 21/482* (2013.01); *H04N 21/6582* (2013.01)

USPC .................................. 725/28; 725/31; 725/32

(58) Field of Classification Search
USPC ................................................ 725/28, 31, 32
See application file for complete search history.

(56) References Cited

U.S. PATENT DOCUMENTS

| | | | |
|---|---|---|---|
| 3,581,029 | A | 5/1971 | Noiles |
| 4,012,583 | A | 3/1977 | Kramer |
| 4,081,754 | A | 3/1978 | Jackson |
| 4,085,422 | A | 4/1978 | Niwata et al. |
| 4,229,765 | A | 10/1980 | Sanger |
| 4,246,495 | A | 1/1981 | Pressman |
| 4,305,131 | A | 12/1981 | Best |
| 4,348,696 | A | 9/1982 | Beier |
| 4,386,436 | A | 5/1983 | Kocher et al. |

(Continued)

FOREIGN PATENT DOCUMENTS

| | | |
|---|---|---|
| EP | 0240794 | 10/1987 |
| EP | 0259666 | 3/1988 |

(Continued)

OTHER PUBLICATIONS

Akimoto et al., "Pixel-Selected Ray Tracing", IEEE Computer Graphics & Applications, pp. 14-22, Jul. 1991.

(Continued)

*Primary Examiner* — Jivka Rabovianski
(74) *Attorney, Agent, or Firm* — Polsinelli PC

(57) ABSTRACT

A program blocking application that blocks programming for one or more possible users, based on various criteria associated with the program. A program word muting application that selectively mutes context specific words as a function of program specific criteria.

19 Claims, 17 Drawing Sheets

(56) References Cited

U.S. PATENT DOCUMENTS

| | | | |
|---|---|---|---|
| 4,449,198 A | 5/1984 | Kroon et al. |
| 4,475,132 A | 10/1984 | Rodesch |
| 4,506,387 A | 3/1985 | Walter |
| 4,520,404 A | 5/1985 | Von Kohorn |
| 4,538,188 A | 8/1985 | Barker et al. |
| 4,554,584 A | 11/1985 | Elam et al. |
| 4,566,033 A | 1/1986 | Reidenouer |
| 4,569,026 A | 2/1986 | Best |
| 4,570,192 A | 2/1986 | Hori |
| 4,605,964 A | 8/1986 | Chard |
| 4,644,515 A | 2/1987 | Allebest et al. |
| 4,685,003 A | 8/1987 | Westland |
| 4,685,131 A | 8/1987 | Horne |
| 4,689,619 A | 8/1987 | O'Brien, Jr. |
| 4,701,896 A | 10/1987 | Allebest et al. |
| 4,729,044 A | 3/1988 | Kiesel |
| 4,744,070 A | 5/1988 | Takemura et al. |
| 4,750,213 A | 6/1988 | Novak |
| 4,754,342 A | 6/1988 | Duffy |
| 4,766,541 A | 8/1988 | Bleich et al. |
| 4,775,935 A | 10/1988 | Yourick |
| 4,782,402 A | 11/1988 | Kanamaru |
| 4,789,894 A | 12/1988 | Cooper |
| 4,871,903 A | 10/1989 | Carrell |
| 4,872,151 A | 10/1989 | Smith |
| 4,873,585 A | 10/1989 | Blanton et al. |
| 4,888,796 A | 12/1989 | Olivo, Jr. |
| 4,891,694 A | 1/1990 | Way |
| 4,930,158 A | 5/1990 | Vogel |
| 4,930,160 A | 5/1990 | Vogel |
| 4,947,244 A | 8/1990 | Fenwick et al. |
| 4,949,187 A | 8/1990 | Cohen |
| 4,956,825 A | 9/1990 | Wilts et al. |
| 4,964,004 A | 10/1990 | Barker |
| 4,972,396 A | 11/1990 | Rafner |
| 4,979,050 A | 12/1990 | Westland et al. |
| 4,995,078 A | 2/1991 | Monslow et al. |
| 5,046,157 A | 9/1991 | Smith et al. |
| 5,051,837 A | 9/1991 | McJunkin |
| 5,057,932 A | 10/1991 | Lang |
| 5,060,068 A | 10/1991 | Lindstrom |
| 5,097,249 A | 3/1992 | Yamamoto |
| 5,101,364 A | 3/1992 | Davenport et al. |
| 5,107,343 A | 4/1992 | Kawai |
| 5,109,482 A | 4/1992 | Bohrman |
| 5,122,886 A | 6/1992 | Tanaka |
| 5,130,792 A | 7/1992 | Tindell et al. |
| 5,132,953 A | 7/1992 | Matsubayashi |
| 5,172,111 A | 12/1992 | Olivo, Jr. |
| 5,175,631 A | 12/1992 | Juri et al. |
| 5,195,135 A | 3/1993 | Palmer |
| 5,199,077 A | 3/1993 | Wilcox et al. |
| 5,206,929 A | 4/1993 | Langford et al. |
| 5,210,611 A | 5/1993 | Yee et al. |
| 5,218,672 A | 6/1993 | Morgan et al. |
| 5,223,924 A | 6/1993 | Strubbe |
| 5,231,310 A | 7/1993 | Oh |
| 5,253,066 A | 10/1993 | Vogel |
| 5,253,275 A | 10/1993 | Yurt et al. |
| 5,267,351 A | 11/1993 | Reber et al. |
| 5,274,463 A | 12/1993 | Matsumoto et al. |
| 5,280,462 A | 1/1994 | Yokogawa |
| 5,296,931 A | 3/1994 | Na |
| 5,313,297 A | 5/1994 | Fukui et al. |
| 5,331,353 A | 7/1994 | Levenson et al. |
| 5,333,091 A | 7/1994 | Iggulden et al. |
| 5,335,079 A | 8/1994 | Yuen et al. |
| 5,353,121 A | 10/1994 | Young et al. |
| 5,367,510 A | 11/1994 | Ando |
| 5,371,795 A | 12/1994 | Vogel |
| 5,387,942 A | 2/1995 | Lemelson |
| 5,434,678 A | 7/1995 | Abecassis |
| 5,477,277 A | 12/1995 | Shimoyanagida et al. |
| 5,477,527 A | 12/1995 | Tsuchiya et al. |
| 5,479,303 A | 12/1995 | Suzuki et al. |
| 5,481,296 A | 1/1996 | Cragun et al. |
| 5,521,900 A | 5/1996 | Ando et al. |
| 5,532,732 A | 7/1996 | Yuen et al. |
| 5,535,186 A | 7/1996 | Ishizawa |
| 5,543,851 A | 8/1996 | Chang |
| 5,546,365 A | 8/1996 | Roth |
| 5,561,457 A | 10/1996 | Cragun et al. |
| 5,563,804 A * | 10/1996 | Mortensen et al. ........... 709/206 |
| 5,572,260 A | 11/1996 | Onishi et al. |
| 5,574,567 A | 11/1996 | Cookson et al. |
| 5,583,576 A | 12/1996 | Perlman et al. |
| 5,589,945 A | 12/1996 | Abecassis |
| 5,598,276 A | 1/1997 | Cookson et al. |
| 5,610,653 A | 3/1997 | Abecassis |
| 5,634,849 A | 6/1997 | Abecassis |
| 5,659,366 A | 8/1997 | Kerman |
| 5,664,046 A | 9/1997 | Abecassis |
| 5,673,089 A | 9/1997 | Yuen et al. |
| 5,684,918 A | 11/1997 | Abecassis |
| 5,696,869 A | 12/1997 | Abecassis |
| 5,699,472 A | 12/1997 | Ueda |
| 5,703,655 A | 12/1997 | Corey et al. |
| 5,717,814 A | 2/1998 | Abecassis |
| 5,724,091 A | 3/1998 | Freeman et al. |
| 5,724,472 A | 3/1998 | Abecassis |
| 5,751,335 A | 5/1998 | Shintani |
| 5,757,417 A | 5/1998 | Aras et al. |
| 5,778,135 A | 7/1998 | Ottesen et al. |
| 5,809,471 A | 9/1998 | Brodsky |
| 5,828,402 A | 10/1998 | Collings |
| 5,835,722 A | 11/1998 | Bradshaw et al. |
| 5,870,708 A | 2/1999 | Stewart |
| 5,872,588 A | 2/1999 | Aras et al. |
| 5,886,746 A | 3/1999 | Yuen et al. |
| 5,913,013 A | 6/1999 | Abecassis |
| 5,953,485 A | 9/1999 | Abecassis |
| 5,987,211 A | 11/1999 | Abecassis |
| 6,002,443 A | 12/1999 | Iggulden |
| 6,002,833 A | 12/1999 | Abecassis |
| 6,009,433 A | 12/1999 | Kurano et al. |
| 6,011,895 A | 1/2000 | Abecassis |
| 6,038,367 A | 3/2000 | Abecassis |
| 6,061,680 A | 5/2000 | Scherf et al. |
| 6,067,401 A | 5/2000 | Abecassis |
| 6,072,520 A | 6/2000 | Yuen et al. |
| 6,072,934 A | 6/2000 | Abecassis |
| 6,075,550 A | 6/2000 | Lapierre |
| 6,091,886 A | 7/2000 | Abecassis |
| 6,100,916 A | 8/2000 | August et al. |
| 6,115,057 A | 9/2000 | Kwoh et al. |
| 6,137,486 A | 10/2000 | Yoshida et al. |
| 6,151,444 A | 11/2000 | Abecassis |
| 6,154,207 A | 11/2000 | Farris et al. |
| 6,166,780 A | 12/2000 | Bray |
| 6,181,364 B1 | 1/2001 | Ford |
| 6,192,340 B1 | 2/2001 | Abecassis |
| 6,208,805 B1 | 3/2001 | Abecassis |
| 6,262,775 B1 | 7/2001 | Kim |
| 6,269,216 B1 | 7/2001 | Abecassis |
| 6,289,165 B1 | 9/2001 | Abecassis |
| 6,304,715 B1 | 10/2001 | Abecassis |
| 6,351,596 B1 | 2/2002 | Ostrover |
| 6,408,128 B1 | 6/2002 | Abecassis |
| 6,463,207 B1 | 10/2002 | Abecassis |
| 6,477,705 B1 | 11/2002 | Yuen et al. |
| 6,504,990 B1 | 1/2003 | Abecassis |
| 6,553,178 B2 | 4/2003 | Abecassis |
| 6,701,523 B1 * | 3/2004 | Hancock et al. ................. 725/25 |
| 6,714,723 B2 | 3/2004 | Abecassis |
| 6,732,367 B1 * | 5/2004 | Ellis et al. ...................... 725/27 |
| 6,756,997 B1 | 6/2004 | Ward, III et al. |
| 6,771,885 B1 | 8/2004 | Agnihotri et al. |
| 6,889,383 B1 | 5/2005 | Jarman |
| 6,898,799 B1 | 5/2005 | Jarman |
| 7,434,245 B1 * | 10/2008 | Shiga et al. ..................... 725/43 |
| 2003/0194211 A1 | 10/2003 | Abecassis |
| 2004/0006767 A1 * | 1/2004 | Robson et al. .................. 725/28 |

(56) References Cited

U.S. PATENT DOCUMENTS

| | | | |
|---|---|---|---|
| 2004/0128681 A1 | 7/2004 | Hancock et al. | |
| 2006/0095262 A1 | 5/2006 | Danieli | |
| 2008/0276278 A1* | 11/2008 | Krieger et al. | 725/40 |

FOREIGN PATENT DOCUMENTS

| | | |
|---|---|---|
| EP | 0443676 | 8/1991 |
| GB | 2041586 | 9/1980 |
| GB | 2179771 | 3/1987 |
| WO | WO97/23996 | 8/1986 |

OTHER PUBLICATIONS

Allen, Christina, "The Use of Video in Organizational Studies", SIGCHI Bulletin, vol. 21, No. 2, pp. 115-117, Oct. 1989.

Allen, James F., "Maintaining Knowledge about Temporal Intervals", Communications of the ACM, vol. 26, No. 11, pp. 832-843, Nov. 1983.

Anderson et al., "A Continuous Media I/O Server and Its Synchronization Mechanism", IEEE, pp. 51-57, Oct. 1991.

Armstrong, Herbert B., "Improving Aviation Accident Research Through the Use of Video", SIGCHI Bulletin, vol. 21, No. 2, pp. 54-56, Oct. 1989.

Ashenhurst, Robert L., "ACM Forum—Letters", Communications of the ACM, vol. 32, No. 7, pp. 789-792, Jul. 1989.

Author Unknown, "Bibliography of Recent Publications on Computer Communication", ACM SIGCOMM, pp. 132-145, date unknown.

Author Unknown, "News Track", Communications of the ACM, vol. 32, No. 7, pp. 777-778, Jul. 1989.

Banerjee, Sanjay, Effects on Moral Rights in renting altered films and in supplying DVD altering software on-line: An analysis of the outcome of possible lawsuits in the US, UK and France, Dissertation for the University of Strathclyde, 68 pages, Sep. 12, 2003.

Billingsley, Pat, "The Standards Factor", SIGCHI Bulletin, vol. 21, No. 2, pp. 13-16, Oct. 1989.

Blinn, James F., "A Trip Down the Graphics Pipeline: Pixel Coordinates", IEEE Computer Graphics and Applications, pp. 81-85, Jul. 1991.

Brunhoff, Todd, "Vex Your Hardware: VEX Version 5.6", Tek Laboratories, Tektronix, Inc., 8 pages, date unknown.

Carey, Tom, "Draft for ACM Self-Assessment Procedure on Human-Computer Interaction", SIGCHI Bulletin, vol. 21, No. 2, pp. 17-24, Oct. 1989.

Carey, Tom, "Video Reviews", SIGCHI Bulletin, vol. 21, No. 2, pp. 128-130, Oct. 1989.

Chow, Mark D., "The Role of the Video Professional in a Research Environment", SIGCHI Bulletin, vol. 21, No. 2, pp. 83-87, Oct. 1989.

Clark, David R., "The Demise of Multimedia", IEEE Computer Graphics and Applications, pp. 75-80, Jul. 1991.

Crane, Gregory, "Hypermedia and the Study of Ancient Culture", IEEE Computer Graphics and Applications, pp. 45-51, Jul. 1991.

Crawford, Diane, "Two Bills Equal Forewarning", Communications of the ACM, vol. 32, No. 7, pp. 780-782, Jul. 1989.

Davenport et al., "Cinematic Primitives for Multimedia", IEEE Computer Graphics and Applications, pp. 67-74, Jul. 1991.

Davenport et al., "Numbers—A Medium That Counts", IEEE Computer Graphics and Applications, pp. 39-44, Jul. 1991.

DeFanti et al., "Basic Zgrass—A Sophisticated Graphics Language for the Bally Home Library Computer", pp. 33-37, date unknown.

Dixon, Douglas F., "Life Before the Chips: Simulating Digital Video Interactive Technology", Communications of the ACM, vol. 32, No. 7, pp. 824-831, Jul. 1989.

Feiner et al., "Automating the Generation of Coordinated Multimedia Explanations", IEEE, pp. 33-41, Oct. 1991.

Fox, Edward A., "Advances in Interactive Digital Multimedia Systems", IEEE, pp. 9-21, Oct. 1991.

Fox, Edward A., "The Coming Revolution", Communications of the ACM, vol. 32, No. 7, pp. 794-801, Jul. 1989.

Frenkel, Karen A., "The Next Generation of Interactive Technologies", Communications of the ACM, vol. 32, No. 7, pp. 872-881, Jul. 1989.

Greif et al., "Computer-Supported Cooperative Work: A Book of Readings", SIGCHI Bulletin, vol. 21, No. 2, pp. 125-128, Oct. 1989.

Grudin, Jonathan, "MCC Human Interface Laboratory Technical Reports", SIGCHI Bulletin, vol. 21, No. 2, pp. 131-137, Oct. 1989.

Halliday, Mark David, "Digital Cinema: An Environment for Multi-threaded Stories", Dissertation, Massachusetts Institute of Technology, 93 pages, 1985.

Harrison et al., "Video: A Design Medium", SIGCHI Bulletin, vol. 21, No. 2, pp. 62-66, Oct. 1989.

Henderson, Austin, "Video and Design", SIGCHI Bulletin, vol. 21, No. 2, pp. 104-107, Oct. 1989.

Horton et al., "Video as an Enabling Technology for Computer-Supported Cooperative Work", vol. 21, No. 2, Oct. 1989.

Kennedy, Sue, "Using Video in the BNR Usability Lab", SIGCHI Bulletin, vol. 21, No. 2, pp. 92-95, Oct. 1989.

Kocher, Bryan, "President's Letter", Communications of the ACM, vol. 32, No. 7, p. 779, Jul. 1989.

Kodali, Nagi, "3D Scene on 2D Screen: The Visualcad Connection", SIGCHI Bulletin, vol. 21, No. 2, pp. 52-53, Oct. 1989.

Lippman et al., "Coding Image Sequences for Interactive Retrieval", Communications of the ACM, vol. 32, No. 7, pp. 852-859, Jul. 1989.

Little, Thomas D.C., "Spatio-Temporal Composition of Distributed Multimedia Objects for Value-Added Networks", IEEE, pp. 42-50, Oct. 1991.

Mackay, Wendy, "EVA: An Experimental Video Annotator for Symbolic Analysis of Video Data", SIGCHI Bulletin, vol. 21, No. 2, pp. 68-71, Oct. 1989.

Mackay et al., "Introduction to the Special Issue on Video as a Research and Design Tool", SIGCHI Bulletin, vol. 21, No. 2, pp. 48-50, Oct. 1989.

Malone et al., "Intelligent Information-Sharing Systems", Communications of the ACM, vol. 30, No. 5, pp. 390-402, May 1987.

Meghini et al., "Conceptual Modeling of Multimedia Documents", IEEE, pp. 23-30, Oct. 1991.

Michon, Brian, "Integrating Motion Video Into Computational Environments", SIGCHI Bulletin, vol. 21, No. 2, pp. 80-82, Oct. 1989.

Nam et al., "Audio-Visual Content-Based Violent Scene Characterization", Department of Electrical and Computer Engineering, University of Minnesota, 4 pages, date unknown.

Neal, Lisa, "The Use of Video in Empirical Research", SIGCHI Bulletin, vol. 21, No. 2, pp. 100-102, Oct. 1989.

Nielsen, Jakob, "Hypertext II", SIGCHI Bulletin, vol. 21, No. 2, pp. 41-47, Oct. 1989.

Palaniappan et al., "InternetExpress: An Inter-Desktop Multimedia Data-Transfer Service", IEEE, pp. 58-67, Oct. 1991.

Pea, Roy D., "Learning through Multimedia", IEEE Computer Graphics and Applications, pp. 58-66, Jul. 1991.

Press, Larry, "Thoughts and Observations at the Microsoft CD-ROM Conference", Communications of the ACM, vol. 32, No. 7, pp. 784-788, Jul. 1989.

Reisman, Sandy, "Developing Multimedia Applications", IEEE Computer Graphics and Applications, pp. 52-57, Jul. 1991.

Ripley, G. David, "DVI—A Digital Multimedia Technology", Communications of the ACM, vol. 32, No. 7, pp. 811-822, Jul. 1989.

Roske-Hofstrand, Renate J., "Video in Applied Cognitive Research for Human-Centered Design", SIGCHI Bulletin, vol. 21, No. 2, pp. 75-77, Oct. 1989.

Rubin, Benjamin, "Constraint-Based Cinematic Editing", Dissertation, Massachusetts Institute of Technology, 67 pages, Jun. 1989.

Rubin et al., "Structured Content Modeling for Cinematic Information", SIGCHI Bulletin, vol. 21, No. 2, pp. 78-79, Oct. 1989.

Schuette, Lawerence C., "Acoustic Holography", IEEE Computer Graphics and Applications, pp. 12-13, Jul. 1991.

Segall, Ricki Goldman, "Thick Descriptions: A Tool for Designing Ethnographic Interactive Videodiscs", SIGCHI Bulletin, vol. 21, No. 2, pp. 118-122, Oct. 1989.

Shaffer, Margaret T., "Use of the EVTA Process in the Evaluation of Human/System Interaction and Performance", SIGCHI Bulletin, vol. 21, No. 2, pp. 89-91, Oct. 1989.

(56) References Cited

OTHER PUBLICATIONS

Stevens, Scott M., "Intelligent Interactive Video Simulation of Code Inspection", Communications of the ACM, vol. 32, No. 7, pp. 832-843, Jul. 1989.
Tatar, Deborah, "Using Video-Based Observation to Shape the Design of a New Technology", SIGCHI Bulletin, vol. 21, No. 2, pp. 108-111, Oct. 1989.
Tinker, Michael, "DVI Parallel Image Compression", Communications of the ACM, vol. 32, No. 7, pp. 844-851, Jul. 1989.
Trigg, Randall H., "Computer Support for Transcribing Recorded Activity", SIGCHI Bulletin, vol. 21, No. 2, pp. 72-74, Oct. 1989.
Vertelney, Laurie, "Using Video to Prototype User Interfaces", SIGCHI Bulletin, vol. 21, No. 2, pp. 57-61, Oct. 1989.
Vin et al., "Multimedia Conferencing in the Etherphone Environment", IEEE, pp. 69-79, Oct. 1991.
Wolff et al., "Mars Navigator: An Interactive, Multimedia Exploration of the Red Planet", Computer Graphics, vol. 25, No. 3, pp. 145-146, Jul. 1991.
Woolsey, Kristina Hooper, "Multimedia Scouting", IEEE Computer Graphics and Applications, pp. 26-38, Jul. 1991.
Yu et al., "Efficient Placement of Audio Data on Optical Disks for Real-Time Applications", Communications of the ACM, vol. 32, No. 7, pp. 862-871, Jul. 1989.
Author Unknown, "Impression Delivery Aquires Prime Cut Entertainment, Broadening its Media Base Into the Video Cassette Distribution Business", PR Newswire Association, Inc., Dec. 1, 1992.
Author Unknown, "Closed Captioning Fundamentals", Link Electronics, Inc., http://www.linkelectronics.com/htm/techcc.htm, 7 pages, date unknown.
Author Unknown, "News Releases", http://www.tvguardian.com/html/movies.html, 1 page, 1999.
Author Unknown, "Principle Solutions, Inc.", http://www.tvguardian.com/html/about_us.htm, 1 page, 1999.
Author Unknown, "Purchase TVGuardian", http://www.tvguardian.com/html/sales.html, 1999.
Author Unknown, "QuickTime Video-Editing Software—Adobe Premiere 2.0", MacWorld, Jan. 1993.
Author Unknown, "Season Pass", Tivo, http://www.tivo.com/1.2.1.asp, 1 page, date unknown.
Author Unknown, "TheFreeDictionary.com—Closed Caption", http://encyclopedia.thefreedictionary.com/Closed%20caption, 3 pages, date unknown.
Author Unknown, "TVGuardian Home—The Foul Language Filter", http//www.tvguardian.com/, 1 page, 1999.
Author Unknown, "TVGuardian in the News", http://www.tvguardian.com/html/in_the_news.html, 1 page, 1999.
Aguirre-Smith et al., "Parsing Movies in Context", MIT Media Lab, pp. 157-167, Summer 1991.
Bray, Rick, "Inventor's Comments", http://www.tvguardian.com/html/information.html, 1997.
Bruno, Richard, "Making compact disks interactive", IEEE Spectrum, pp. 40-45, Nov. 1987.
Coleman, Murray, "Dad of Teens Invents TV Filter for Foul Language", http://store.dove.org/Hardware/TVGuardian/ArDemGaz.htm, Little Rock Newspapers, Inc., 1 page, 1997.
Cudlitz, Stuart, "Star Quality", MacWorld, pp. 117-123, Jun. 1989.
Davidow, Bernard T., "Black box filters dirty words from TV shows", The Hartford Courant, 1 page, date unknown.
Mackay et al., "Virtual Video Editing in Interactive Multimedia Applications", Communications of the ACM, pp. 802-810, Jul. 1989.
Sasnett, "Reconfigurable Video", Massachusetts Institute of Technology, Feb. 1986.

\* cited by examiner

USER 1: BLOCKING TABLE

| Field | Value |
|---|---|
| START TIME | NA |
| END TIME | NA |
| CHANNEL | CINEMAX |
| CHANNEL | SHOWTIME |
| PROGRAM | NA |
| INFO TEXT | NA |
| TOPIC | NA |
| ACTOR | PAMELA ANDERSEN |
| PERSON | NA |
| DIRECTOR | NA |
| RATING | PG |
| DAY | MONDAY |
| DAY | TUESDAY |
| DAY | WEDNESDAY |
| DAY | THURSDAY |
| BLOCKING CODE* | NA |
| WORD | NA |
| CLOSE CAPTION | NA |
| STARS | NA |
| TOTAL VIEWING TIME | NA |

SET-UP

*SEE PROGRAM GUIDE FOR AVAILABLE BLOCKING CODES

FIG. 2

TUESDAY　　　PROGRAM　　　／— 16
October 19, 2004　　　GUIDE

8:05 pm

| | 8:00 PM | 8:30 PM | 9:00 PM | 9:30 PM |
|---|---|---|---|---|
| USA 97 | Kiss the Girls | | Law & Order: Special Victims Unit | |
| Game 98 | Celebrity Blackjack | | Who Wants to be a Millionaire | |
| A&E 99 | Dog the Bounty Hunter | Dog the Bounty Hunter | Crossing Jordan | |
| E! 100 | The E! True Hollywood Story | Howard Stern | Howard Stern | |

Program Blocking — 40

FIG. 5

BLOCKING FILTER SET-UP: PLEASE ENTER ONE OR MORE BLOCKING FILTERS

| Field | Value |
|---|---|
| START TIME | 8:30 PM ▽ |
| END TIME | 9:00 PM ▽ |
| CHANNEL | ▽ |
| PROGRAM | ▽ |
| TOPIC | ▽ |
| INFO TEXT | ▽ |
| ACTOR | PAMELA ANDERSEN ▽ |
| PERSON | ▽ |
| DIRECTOR | ▽ |
| RATING | ▽ |
| DAY | TUESDAY ▽ |
| BLOCKING CODE* | ▽ |
| WORD | ▽ |
| CLOSE CAPTIONING | ▽ |
| STARS | ▽ |
| TOTAL VIEWING TIME | ▽ |

*SEE PROGRAM GUIDE FOR AVAILABLE BLOCKING CODES

VIEWING CRITERIA: PLEASE ENTER ONE OR MORE VIEWING CRITERIA    146

START TIME

END TIME

CHANNEL

PROGRAM

TOPIC

ACTOR

PERSON

DIRECTOR

RATING

DAY

TOTAL VIEWING TIME

SUPPLEMENTAL WORD MUTING SELECTION:
PLEASE ENTER ONE OR SUPPLEMENTAL WORD FILTERS 156, 180, 182

| | | | |
|---|---|---|---|
| 160 — START TIME | | | ▽ |
| 162 — END TIME | AFTER 9:00 pm | MUTE | ▽ |
| 164 — CHANNEL | ALL MOVIE CHANNELS | MUTE | ▽ |
| 166 — PROGRAM | | | ▽ |
| 168 — TOPIC | | | ▽ |
| 170 — ACTOR | HOWARD STERN | MUTE | ▽ |
| 172 — PERSON | | | ▽ |
| 174 — RATING | | | ▽ |
| 176 — DAY | | | ▽ |
| 178 — BLOCKING CODE* | | | ▽ |

FIG. 15

APPARATUS AND METHOD FOR BLOCKING AUDIO/VISUAL PROGRAMMING AND FOR MUTING AUDIO

CROSS-REFERENCE TO RELATED APPLICATIONS

The present application is a non-provisional application related to and claiming priority to U.S. Provisional Application No. 60/481,544 titled "Blocking/Allowing of Television Programs Based on User-Specific Selection" filed on Oct. 22, 2003, and U.S. Provisional Application No. 60/481,548 titled "Parental Control Filter Settings Based on Information Associated with the Media Content" filed on Oct. 23, 2003, both of which are hereby incorporated by reference herein.

FIELD OF THE INVENTION

The present application generally involves the field of audio and visual presentation control, and more particularly involve program blocking and audio muting.

BACKGROUND

Within the broad diversity of television programming, a particular viewer may feel some television programs are acceptable, and other programs are offensive. Moreover, a parent may feel that some programs are suitable for their children and others are not. V-Chip technology was created in an effort to help owners of televisions better control the types of programming content that is accessible through their television. V-Chip technology is based on a system where parental ratings are associated with different television programs, and the user of the television can block programs based on ratings. For example, a television user could select to block all programs that are rated "TV-MA." The "MA" stands for mature audiences and indicates that the program is specifically designed to be viewed by adults and therefore may be unsuitable for children under 17.

With a V-Chip enabled television, a user can only categorically block content based on the program's rating designation. For example, a parent may wish to block all episodes of the television sitcom Coupling™ because of its sexually charged content. Coupling™ has a TV-14 rating, but the television user may not want to block all programs with the TV-14 rating. The user may only want to block all episodes of the "Coupling" television program, and permit access to other television programs that have a TV-14 rating. Also, a user may want to only allow certain selected programs, and block all other programs. For example, parents may wish to allow access to the children's program "Sesame Street" and the children's program "Mr. Rogers" but then block all other programs.

If a media program (i.e. a television show) contains content that a parent finds objectionable (i.e. certain words or phrases), the parent could use a filtering application to filter or block the objectionable content during the presentation of the program. Applications exist for muting objectionable words. However, some words or phrases might be offensive in one context, but acceptable in a different context. For example, a parent might find the word "bitch" offensive when used as an insult, but find the word "bitch" acceptable when used in reference to a female dog. This problem can sometimes be solved by examining the words that proceed and follow the questionable word. For example, "you" followed immediately by "bitch" would indicate a high probability that the word "bitch" is being used in an offensive manner. However, when the word "the" is followed immediately by the word "bitch" it is difficult to accurately determine the context of the word based on the surrounding words.

These and other issues may be resolved by various implementations of the present invention as set forth in detail below.

BRIEF SUMMARY OF THE INVENTION

One aspect of the present invention involves a method for blocking one or more programs amongst a plurality of programming options. The method comprises the operations of: receiving an audio/video programming signal comprising a plurality of programs. Before or after receipt of the signal, receiving an indication to block display of at least one particular program. Display of the at least one particular program is then blocked.

Another aspect of the present invention also involves a method for blocking one or more programs amongst a plurality of programming options. The method comprises the operations of: receiving an audio/video programming signal comprising a plurality of programs, wherein each program is associated with an informational description of the program that is adapted for display in association with the program, the information description comprising at least one word describing the program; receiving an indication of at least one blocking word; receiving an indication to block viewing of a program containing the at least one particular blocking word in the information description associated with any of the plurality of programs; and blocking display of any of the plurality of programs associated with an information description including the at least one blocking word.

Another aspect of the present invention also involves a method for blocking one or more programs amongst a plurality of programming options. The method comprises the operations of: receiving an audio/video programming signal comprising a plurality of programs, wherein each program is associated with an audio signal; receiving an indication of at least one blocking word; receiving an indication to block viewing of a program containing the at least one blocking word in the audio signal associated with any of the plurality of programs; and blocking display of any of the plurality of programs corresponding with an audio signal including the at least one blocking word.

Yet another aspect of the present invention involves a method for blocking one or more programs amongst a plurality of programming options, the method comprising: receiving an audio/video programming signal comprising a plurality of programs, each of the plurality of programs being associated with program specific information; receiving an indication to allow play of only programs associate with selected program specific information; and blocking display of all programs not including the selected program specific information.

Finally, aspects of the present invention also involve a method of muting a word in a program audio signal comprising: identifying a word in the audio signal for muting, the word having a first meaning and a second meaning; identifying at least one program characteristic of the program; and muting the particular word as a function of whether the word is used in a program having the at least one characteristic.

BRIEF DESCRIPTION OF THE DRAWINGS

FIG. 2 is a diagram illustrating one example of program blocking filters, in accordance with aspects of the present invention;

FIG. 5 is a diagram illustrating a program guide including a program blocking onscreen button, in accordance with aspects of the present invention;

FIG. 7 is an example of a blocking filter setup menu, with a plurality of blocking categories in a plurality of blocking filters for each blocking category shown in dropdown menus, in accordance with aspects of the present invention;

FIG. 11 is a viewing criteria setup screen adapted to allow programming and block all other programming, in accordance with one aspect of the present invention;

FIG. 15 is a diagram illustrating a menu for defining supplemental word muting selections, in accordance with aspects of the present invention;

DETAILED DESCRIPTION OF EMBODIMENTS OF THE INVENTION

Aspects of the present invention involves methods and apparatus adapted to block programming based on various blocking criteria. The blocking criteria may be selected in a number of ways in a highly customizable manner. For example, aspects of the present invention allow for program blocking based upon program start time and end time, channel, program title (complete or partial), program topic, actor, director, other person, rating, day, blocking code, complete or partial word or words, and total viewing time. Various implementations of the present invention can allow any combination of the various blocking criteria. Moreover, the various blocking criteria may be applied individually or in combination, and may be applied in a logical AND or logical OR configuration. Additionally, the various blocking criteria may be replicated, such as for allowing multiple programs to be blocked and set-up for blocking.

The user may establish blocking criteria through an onscreen menu before viewing. The user may also establish blocking criteria during viewing. Blocking criteria may be customized for a plurality of different viewers. Moreover, blocking criteria can be set on a user basis.

Figure 1:
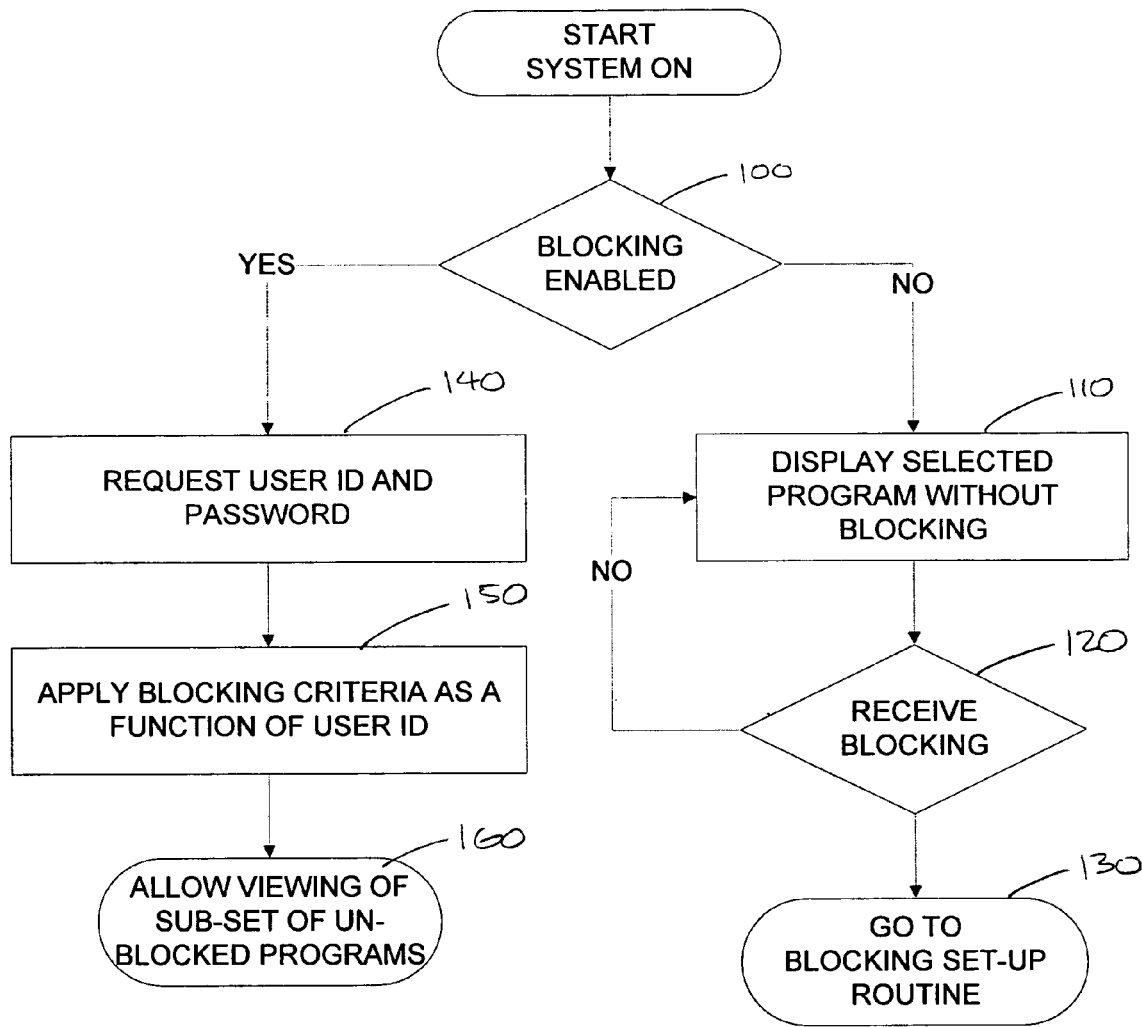
FIG. 1 is a flowchart illustrating one method for program blocking, in accordance with aspects of the present invention.

FIG. 1 is a flowchart illustrating one method conforming to aspects of the present invention. When an audio/video viewing system is first turned on, the set-top box, DVD or other component configured in accordance with aspects of the present invention, checks to determine whether blocking has been previously enabled (operation 100). Various particular implementations of the present invention are set forth herein. Implementations of the present invention can be in hardware, software, or combinations of the same. Further, implementations of the present invention can be employed in a cable or satellite set-top box, DVD player, VCR player, audio/video receiver, analog or digital television, personalized video recording device, customized box, or other such audio/video device adapted to receive or other process a television signal, digital or analog. In one particular implementation, the blocking applications are run in a component necessary for viewing a program to avoid bypass of the system.

If blocking has not been previously enabled, then program selection and viewing proceeds without any control by a blocking application (operation 110). Any time while the A/V system is on, or at least the component configured to operate in accordance herewith, a user may enable blocking (operation 120). As discussed further below, onscreen menus provide one particular input medium for setting up and enabling program blocking on a user basis. When a blocking command is received, the menus are displayed on the television screen, which is discussed further below (operation 130).

If blocking has been previously enabled, then the system prompts the user to enter a user identification ("user ID") and a user password (operation 140). Input of both a user ID and a password is discussed with reference to various embodiments; however, systems may be implemented that require only a user ID, only a password, or some other form of user identification, or potentially no identification at all. The user identification and password allow the system to be configured so that blocking proceeds on a user-by-user basis. In one particular implementation, a master user and associated password may be established, which user has authority to view all programming and to set-up and actuate blocking for other users, as well as define users. In such an implementation, for example, it is possible for a parent (master user) to set up customized blocking parameters for each child in the family (other users). Moreover, in a distributed system, it is possible to set up blocking parameters for numerous users and user set-top boxes.

Aspects of the present invention can also be implemented at television programming distribution equipment, such as the cable head end, and the like. One aspect of the present invention, allows for distribution of blocking parameters. For example, a particular satellite TV subscriber may have a plurality of set-top boxes, each which may allow for independent viewing. In one implementation, when the master user establishes blocking criteria through one set top box, the blocking criteria are stored at the distribution head end, a server, or other remote location. Whenever one of the other set-top boxes are powered on, it sends an identification signal to the head end. Upon recognition of the set-top box, the head end determines whether new blocking codes have been established, and if so, the head end transmits the new blocking codes to the set-top box. The blocking code update continues until all set-top boxes for the subscriber are updated. It is also possible to run the blocking and muting platforms herein at the head end, server, or other remote location and limit or eliminate processing at the user location.

The user ID and password may be entered through an onscreen menu. Due to the inherent limitations of most current remote control devices, which typically only have numeric keys and are lacking in alphabet keys, the user ID and password may be limited to numeric characters for convenience. Additionally, systems conforming to the present invention may be provided with an onscreen keyboard, allow for a keyboard to be connected with the system, and support other interface technology. Moreover, with advances in interface technology and remote control devices, embodiments of the present invention may be adapted so that alpha-numeric characters may be employed for both user ID and password efficiently with the remote.

Upon receipt of a valid user ID and password, the system checks the blocking criteria for the particular user ID accessing the system and applies that blocking criteria to the programming selections available to that user (operation 150). Thus, programming viewing proceeds limited to a subset of unblocked programs (operation 160).

FIG. 2 is an example of one particular blocking table 10 for an example user 1. The various methods for defining and establishing blocking criteria are discussed in further detail below. In the example set forth in FIG. 2, numerous particular blocking criteria 12 are shown. The blocking criteria include start time, end time, channel, program, topic, actor, person, director, rating, day, blocking code, word, and total viewing time. In the example user 1 blocking filter setup, the Cinemax™ and Showtime™ channels are blocked for this user. As such, each might be referred to herein as a channel blocking filter. In addition, the actor blocking filter is configured with the actress Pamela Anderson. The rating blocking filter is set with the "PG" Motion Picture Association of America ("MPAA") symbol and/or TV Ratings symbols. Additionally, four "day" blocking filters are set for Monday, Tuesday, Wednesday, and Thursday. As such, if user 1 attempts to view a program on either the Cinemax™ or Showtime™ channels, those channels are blocked for viewing. If user 1 selects a program that has been associated with the actress Pamela Anderson, then user 1 is blocked from viewing that program. With respect to the rating criteria, user 1 is blocked from watching any program with a rating higher than PG. Besides the MPAA rating system, other rating systems, such as the TV Rating System, may also be employed in aspects of the present invention. Finally, if the user attempts to watch a program on Monday, Tuesday, Wednesday, or Thursday, viewing is blocked. As such, the user may only view programs on Friday, Saturday, and Sunday. In this example, the blocking filter settings are shown in a separate on-screen display; however, it is possible to view the blocking settings with the blocking filter selection/set-up menu screen (discussed below with respect to FIG. 7). With a separate viewing screen the users may view their blocking parameters, but not be allowed access to the set-up screen. Or, as shown in FIG. 2, a set-up button 14 may be employed which would provide access to the set-up menu of FIG. 7, provided the master ID and password are properly input.

Figure 3A:
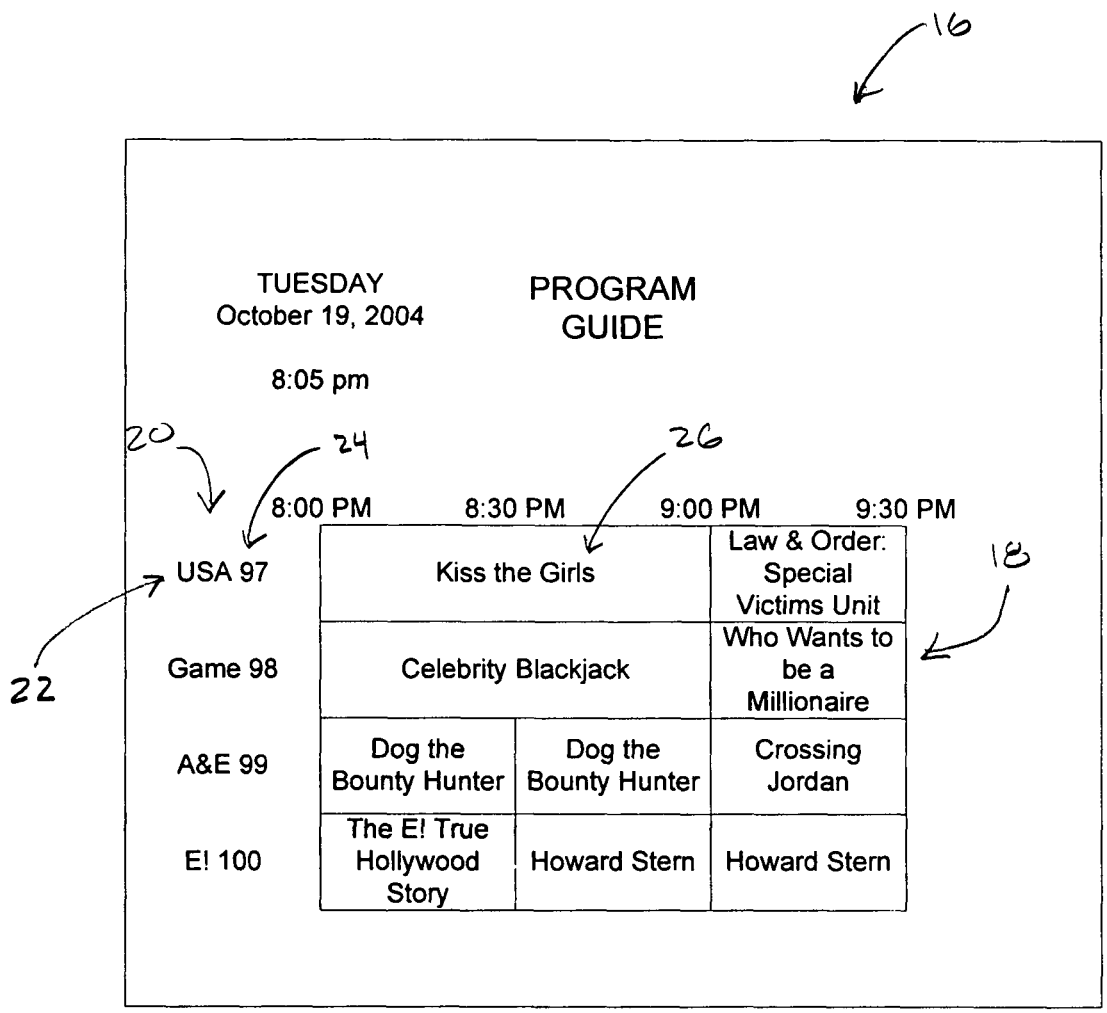
FIG. 3A is a diagram illustrating an example of a program guide.
Figure 3B:
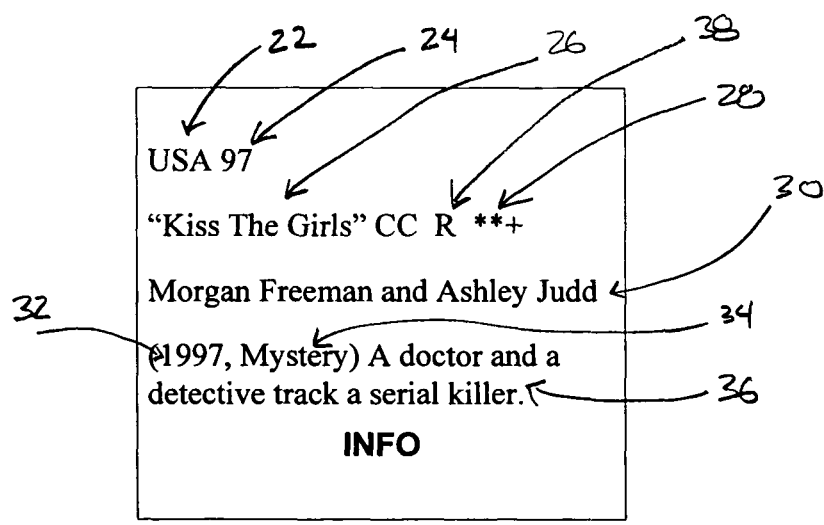
FIG. 3B is a diagram of an info box, which is displayed when an info button on a remote is depressed and a particular program in a program guide is selected.

FIG. 3A illustrates an exemplary onscreen program guide 16, such as is available through some cable and satellite television viewing systems, such as Dish Network™. The examples of programs of FIGS. 3A and 3B are discussed hereafter with reference to how blocking would proceed with the blocking filter settings of FIG. 2. Example programming guide distribution and display platforms, related audio/video processing equipment, and remote control devices, which may be employed and/or operationally modified in accordance with various aspects of the present invention, are described is U.S. Pat. No. 6,477,705 titled "Method and Apparatus for Transmitting, Storing, and Processing Electronic Program Guide Data for On-screen Display" issued on Nov. 5, 2002, and U.S. Pat. No. 6,756,997 titled "Systems and Methods for Displaying and Recording Control Interface with Television Programs, Video, Advertising Information and Program Scheduling Information," issued on Jun. 29, 2004, both of which are hereby incorporated by reference herein. The program guide data can also be sent via a phone line that is connected to the system. The channel pull-down can be populated through the program guide information, or by the tuner profiling each station and retrieving station information (the channel setup feature on most televisions).

In the example of FIG. 3A, the program options 18 for four channels 20 between 8 p.m. and 9:30 p.m. are shown. The day is Tuesday and it is 8:05 p.m. As such, user 1 would be blocked in this example from viewing any programming because the "day" blocking criteria is set with "Tuesday," which blocks all viewing for user 1 on Tuesday. FIG. 3B is an "info" screen, which is displayed when a user highlights a program of an onscreen programming guide. In FIG. 3A, the program "Kiss the Girls" is highlighted, and the user depresses an "info" button or similar button on a remote to display FIG. 3B. Each program identified in an on-screen programming guide typically includes some information about the program. The program guide and program information is typically stored in set-top box memory, for a cable or satellite system, and is updated periodically or when necessary. Additional information can be provided in the vertical blanking interval ("VBI"). As shown in FIG. 3B, the information associated with a program can include the network 22 (USA™) and channel 24 (97), the title 26 of the selected program ("Kiss the Girls"), some indication of the quality of program 28 (***), the actors 30 in the program (Morgan Freeman and Ashley Judd), which typically only includes the lead actors, but may be modified to include other actors that may not necessarily be displayed in the info box but can be used to block viewing, the year of the program 32 (1997), the category 34 of the program (Mystery), a short textual description of the program 36, and the program rating 38 (R). Through activation of various blocking filters, nearly any information associated with a program or programs may be used to block programming.

Figure 4:
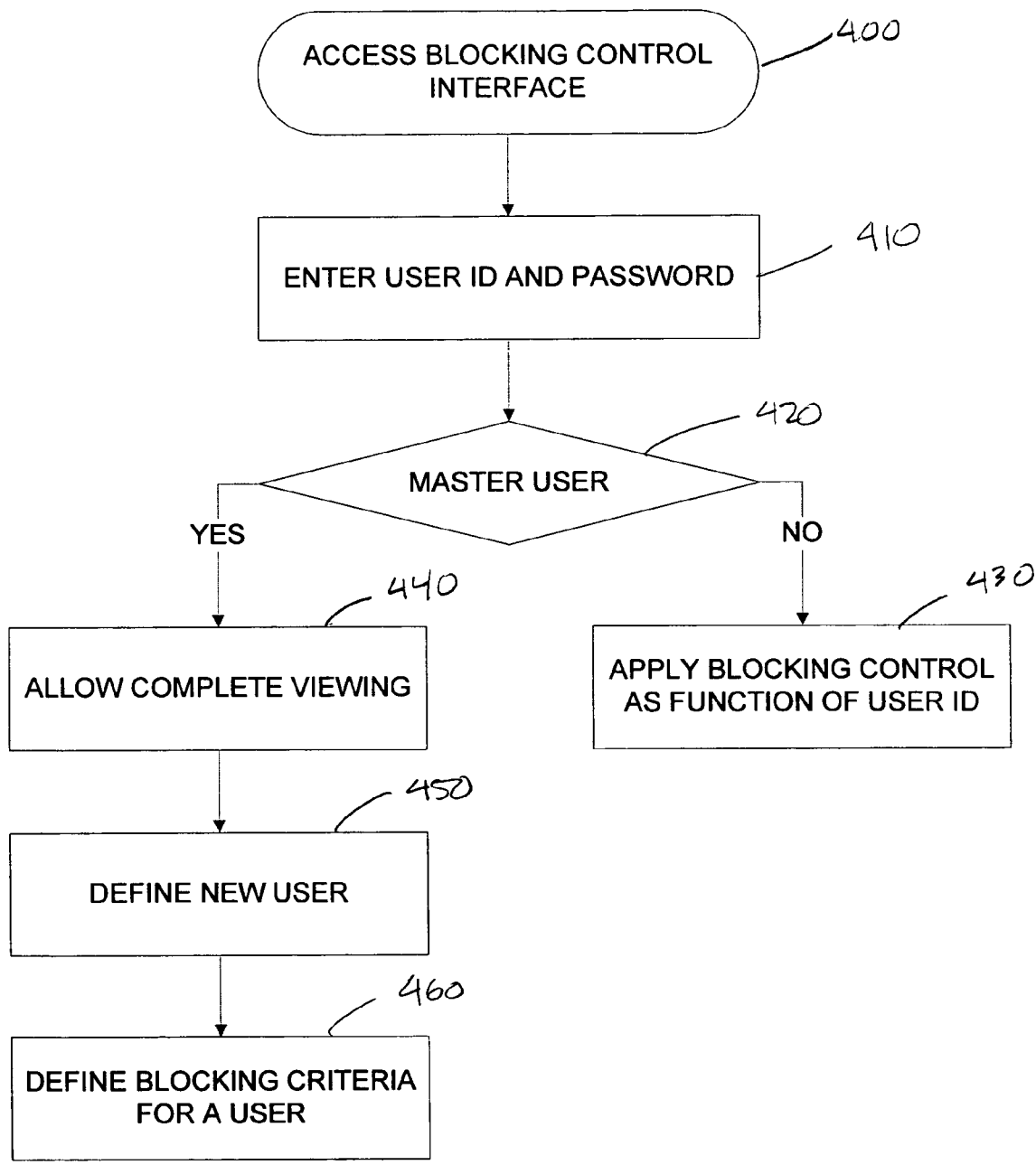
FIG. 4 is a flowchart illustrating one particular method for program blocking, in accordance with aspects of the present invention.
Figure 6:
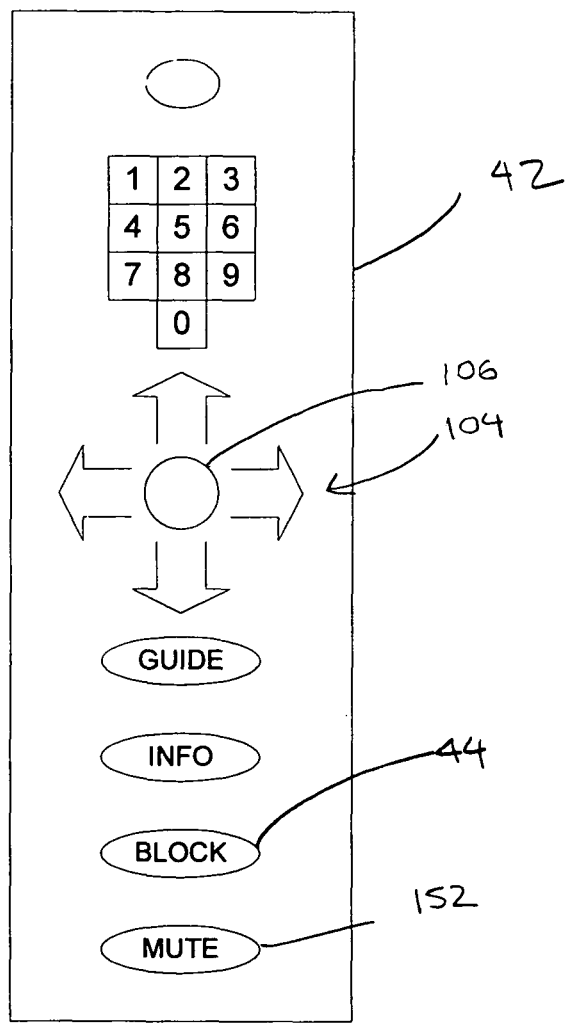
FIG. 6 is a diagram of a remote including a program block activation button, in accordance with aspects of the present invention.

FIG. 4 is a flowchart illustrating another method conforming to certain aspects of the present invention. To set up a blocking filter table, such as that shown in FIG. 2, a user must first access a blocking control menu (operation 400). Access may be achieved, depending upon the particular implementation, in a number of ways. In one example, the onscreen program guide is modified to include a program blocking menu selection. One example of a program blocking menu selection 40 is shown in the example program guide 16 of FIG. 5. With an arrow key on a remote, the user scrolls to the "program blocking" button 40 on the on-screen program guide and selects enter, which will cause the system to query the user for a user ID and password (operation 410), unless previously provided in the current viewing session. Alternatively, as shown in FIG. 6, a remote control unit 42 may be configured to include a "block" button 44. Upon activation of the block button, the remote control unit sends a signal to the system unit indicating that the user has depressed the block button. The receiver unit in response thereto begins the access routine to the blocking control menu, by determining whether a user ID and password have been previously entered, and requesting entry if not (operation 410).

The system is configured, in one particular implementation, to recognize a master user (operation 430). The master user has the authority within the system to establish blocking criteria for other users and to disable blocking criteria for other users. The master user is identified through a user ID and password. The master user has complete viewing permission (operation 440). If other users attempt to access the blocking set-up menus (operation 420) they are denied access and viewing proceeds subject to whatever blocking is set for the user (operation 430). Upon receipt of the correct master user ID and password (operation 420), the system prompts the master user for the user ID that blocking parameters will be established for.

As mentioned elsewhere herein, the system may support a number of different users, each with unique blocking parameters. The system will prompt the master user to set-up a new user (operation 450). To set up a new user, the master user enters a user name designation and password. The user name may be entered with the remote or through selection of a name from a dropdown menu. The password (or number) is input with the remote or can be generated by the system. When a new user is added, subsequent setup screens will display the new user. Upon receipt of a user ID, the system prompts the master user to establish one or more blocking control parameters that will be applied when the selected user ID accesses the system and attempts to view programming (operation 460).

FIG. 7 illustrates a blocking filter setup menu 46, in accordance with one aspect of the present invention. The menu includes several different blocking categories 12 each configured in a dropdown menu arrangement 48 for easy user selection. Each dropdown menu, when selected, includes a number of different possible blocking filters for each blocking criteria that may be selected by the user in various different ways. In one particular example, the dropdown menus are populated with blocking criteria at system setup time, typically by the manufacturer. During the course of use of the system, the dropdown menus may further be populated over time with new blocking criteria by data transmissions to the system over a network connection, integrated within the broadcast transmissions, such as through the VBI, or updated through a removable memory device. For example, in a system configured with a removable memory such as a floppy disk, DVD or the like, it is possible to load blocking filter updates, which are then loaded directly into permanent system memory.

Referring again to FIG. 7, numerous blocking filter categories are shown. The blocking categories include: Start time 50, end time 52, channel 54, program 56, info text 58, topic 60, actor 62, person 64, director 66, rating 68, day 70, blocking code 72, word 74, close captioning 76, stars 78, and total viewing time 80. Such a variety of blocking categories 12 allow the master user to highly customize the program viewing experience of numerous different potential users. Each blocking category can include numerous individual blocking filters 82, which can be activated individually or in combination.

The start and end time blocking criteria (50, 52) allow a user to block viewing for certain portions of time. Such time based blocking may be employed by the user in a number of different ways. For example, if a particular program that the master user wishes to block for a particular user, is typically shown between 8:30 p.m. and 9:00 p.m. on Tuesdays, then the user may enter an "8:30 p.m." filter 84 in the start time category 50, a "9:00 p.m." filter 86 in the end time blocking category 52 and enter a Tuesday 88 filter in the day blocking category 70. The combination of start time, end time and day blocking filters will cause the system to block viewing between 8:30 and 9:00 p.m. on Tuesday.

Figure 8:
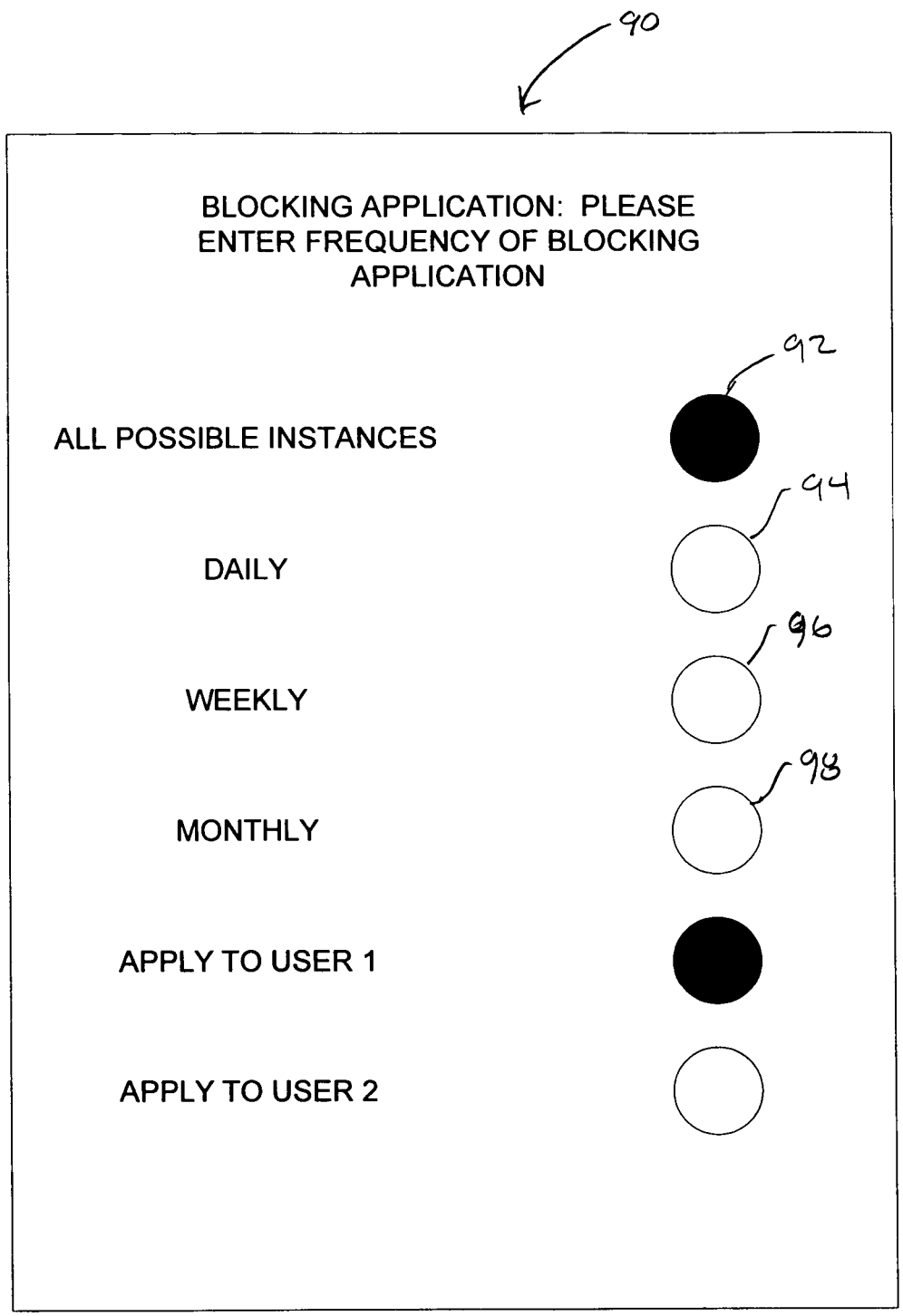
FIG. 8 is a diagram illustrating a temporal blocking application menu, in accordance with aspects of the present invention.

FIG. 8 is a second blocking criteria setup menu 90, which allows the master user to temporally implement the various blocking criteria. As shown in FIG. 8, the blocking application menu 90 allows a user to block all possible instances (all possible instances button 92), establish blocking on a daily basis (daily button 94), on a weekly basis (weekly button 96), and on a monthly basis (monthly button 98). The blocking application screen also allows the user to establish the blocking criteria for the various identified users of the system. In the example set forth immediately above, the user has selected all possible instances and application of the blocking filters to user 1. Thus, each Tuesday between 8:30 and 9:00 p.m., user 1 is blocked from all viewing. The user could achieve the same result by selecting the weekly implementation.

Referring again to FIG. 7, the blocking categories include the channel blocking category 54. The channel blocking category allows a master user to block various particular channels (channel filters) for the various identified users of the system. In one particular implementation of the present invention, the channel blocking category dropdown menu 102 is populated with channel filters according to the subscription type of the user. Thus, for example, if a user's particular cable, satellite, or other subscription includes a limited number of all the possible channels available, the limited number of channels are displayed in the channel blocking dropdown menu. The user may select any combination of channels, or directly enter a channel number with a remote, for example, each selected channel is blocked from viewing for a selected user or users. By depressing the various arrow keys 104 on the remote 42, a master user scrolls to the channel dropdown menu and depresses the enter or select button 106. Depression of the select button causes the dropdown menu to appear and populate with all the possible channel selections (i.e., all possible channel blocking filters). The user then once again scrolls through the various channel selections with the arrow keys, and by hitting the "select" or "block" button on the remote, highlights a channel for blocking. If the user selects the channel a second time, then the channel is no longer highlighted and will not be blocked. The user may select any number of possible channels in this way. Channels can be shown by network affiliation, e.g., NBC™, ABC™, Showtime™, etc., can be shown by stations number, e.g., 4, 7, 250, etc., combination of station and number, or in separate/distinct categories.

The program blocking category 56 allows a user to block one or more particular programs. This blocking criteria dropdown menu 108 is populated whenever the program guide is updated. Each possible program currently viewable, depending on the time range of the program menu, may be selected through this blocking criteria. When a program is selected, it may be blocked in a number of different ways. Referring again to FIG. 8, if the user selects the "daily" button 94, the blocking application will search through all program possibilities each day and block all particular instances of the program. If the user, for example, recognizes that the program is typically shown on a particular station, such as NBC™, then the user may input NBC™ in the channel category 54 and the program in the program category. In which case the application will block all instances of the program on that particular selected channel, but will not block all instances of the program that may be shown on other channels. To populate the program guide each program is transmitted in association with identifiers unique to the program. The blocking application is configured to recognize the program identifiers and compare them with the program blocking in blocked instances of programs that have been set up by the master user for blocking.

Referring again to FIG. 7, a topical blocking category 58 is also included in some particular implementations of the present invention. Many programs are transmitted with certain topical identifiers associated therewith, such as "mystery," "adult," and "action." The movie "Kiss the Girls" discussed above with reference to FIGS. 3A and 3B, is considered a "mystery," for example, and includes a "mystery" 34 topical identifier. If the user would like to block all instances of programming that are associated with the "adult" topical identifier, then the user populates the topic blocking category with the adult blocking filter, which would be provided in the dropdown menu 111. As such, all instances of adult programming that are associated with the adult topical identifier would be blocked from viewing for the particular user. All possible instances, in the above example, would be selected in FIG. 8. If the master user were to select weekly 96 or monthly 98 with respect to a topical filter or filters, the system would default to the all possible instances identifier as the master user had not limited the topical identifier to a particular day or other blocking criteria.

The info text blocking category 60 allows a user to block programming based on words in the information box. The info text dropdown menu 112 can be populated, alphabetically, with any number of possible words or word combinations that a user may want to block programming associated with. For example, a parent may want to block any program associated with the word "killer" or the words "serial killer." Referring again to the example of "Kiss the Girls," if the user had activated either the "killer" or "serial killer" or both info text blocking filters, then a user for which the filters were activated would not be able to view the film "Kiss the Girls." Words may also be entered through a plug-in keyboard, an onscreen keyboard, or the like.

Below the info text blocking category is an actor blocking category. This category allows the master user to block all programs transmitted in association with a particular actor. Typically programs are associated with lead actors and actresses. Actors and actresses with lesser roles may not be associated with the programming and thus may not be blocked with the actor blocking criteria. As mentioned earlier, it is possible to transmit a larger list of actors for a particular program and store the list in system memory, even if the additional actors are not displayed in the info field. It is also possible to store additional information about a program, at a remote location, e.g., cable head end and server, and block based on the remotely stored information 118. In the example of FIG. 7, the actress Pamela Anderson has been entered in the actor category. Thus, all instances of programming that are associated with Pamela Anderson will be blocked from viewing for user 1. Such programming may include news shows where Pamela Anderson is being interviewed as well as a sitcom or movie in which Pamela Anderson is playing a lead role and is associated with the programming when it is transmitted or broadcast and received by the system. The person and director blocking categories (64, 66) are similar to the actor category in that they are configured to block a particular person or director associated with particular programming. The dropdown menus (114, 116, 118) are populated with actors, directors, and people (typically people in the news, politicians, and other "famous" people), that the master user may select.

The rating blocking category 46 allows the master user to block programming with certain ratings associated therewith. For example, if the master user selects the PG rating, then all shows with a PG rating or less, such as G rating, will be available for viewing. All programming with a rating higher than PG, such as PG-13 and R, are blocked from viewing. In one particular implementation of the present invention, the MPAA ratings are available in the dropdown menu as well as other various rating systems typically associated with programming. The ratings may be displayed according to relative associations such as G, PG, PG-13, R, NC-17, X, for example. As with other blocking criteria set forth herein as different rating schemes are developed and deployed, these various rating schemes would be uploaded to the system memory and populate the dropdown menu 121.

The day blocking category 70 allows a user to limit various blocking to particular days of the week. This particular blocking category will oftentimes be employed in conjunction with the temporal blocking applications set forth in FIG. 8. So, for example, when the user selects a particular start and end time and day of the week, and then selects the weekly application of FIG. 8, then that particular time and day is blocked on a weekly basis for the selected user. If the user would like to block a particular start and end time on a daily basis, then this may be achieved at least three different ways. The user may enter the start and end time (84, 86) and then populate each day of the week in the day blocking category 70 (i.e., select Sunday, Monday, Tuesday, Wednesday, Thursday, Friday, Saturday and Sunday day blocking filters in the day dropdown menu 122). The user may also select the daily blocking application 94 or the all possible instances blocking application 92 of FIG. 8.

The blocking criteria also includes a blocking code selection 72. In one particular implementation of the present invention, a blocking code is transmitted with a particular program and populates the information field when a user selects an "info" button on their remote for a particular program. The blocking codes may also be published in paper-based programming guides or available through other media. Thus, for example, a particular program will always be associated with a particular blocking code. Alternatively, various topics, channels, and the like, may also be associated with a blocking code. By entering the blocking code in the category window or by selecting the appropriate blocking code in the dropdown menu 124, the master user blocks all particular programming associated with the blocking code.

A word blocking category 74 is also provided in various aspects of the present invention. The word blocking category allows a user to prospectively block programming that employs various foul or objectionable words. For example, a user may allow certain programming at various times of day and on various channels; however, should the programming use a particular word, then that programming would be blocked in future instances. The category may further be tailored to allow blocking after some number of uses of the word. In this way, the master user can adapt programming that they are not familiar with for viewing or not viewing depending on whether or not that programming crosses a certain comfort-line of the master user. Objectionable words that will result in blocking of a program may be identified by comparing words in the blocking list with a close captioning stream associated with the program to determine whether the specified word is used in the program. Various word blocking filters are provided in the dropdown menu 126. It is also possible to group words in various levels of profanity, and the user to activate filtering on a group basis.

Implementations of the present invention can also include close captioning and stars blocking categories (74, 76) and associated filter dropdown menus (128, 131). The close captioning allows programs to be blanked that are not accompanied with close captioning. The stars blocking category allows a user to block programs that fall below a certain "star" rating, e.g., no stars, one star (*), two stars (), etc. Finally, a total viewing time blocking category 80 is also provided in some implementations of the present invention. This blocking category allows a user to view programming for certain allotted times. Used in conjunction with the blocking application screen of FIG. 8**, the master user can configure the total viewing time on a daily, weekly or monthly basis. Thus, for example, if the master user enters ten hours in the total viewing time, and selects daily, weekly or monthly, then the selected user would be blocked for all programming beyond ten hours a day, a week, or a month, respectively.

Figure 9:
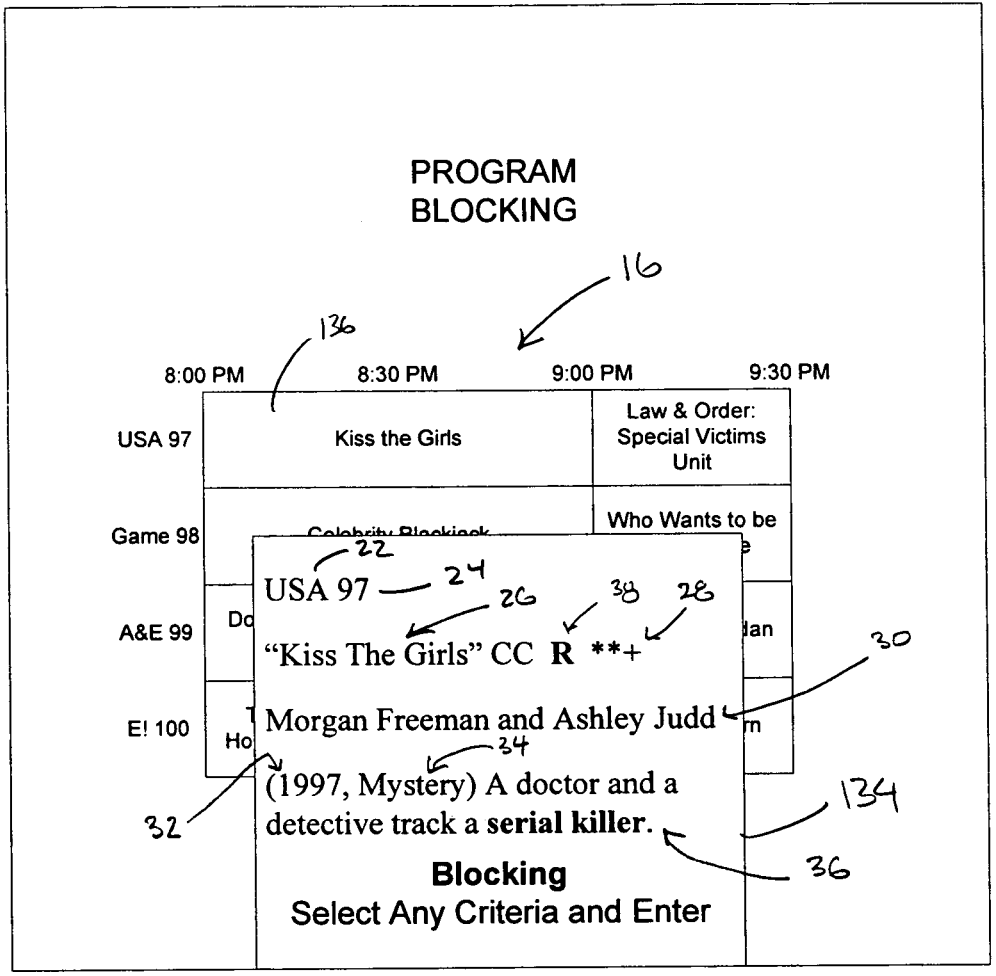
FIG. 9 is a diagram illustrating an alternative blocking filter application screen, in accordance with aspects of the present invention.

FIG. 9 illustrates a program blocking menu 134 that is displayed in certain embodiments of the present invention when the block button is depressed on the remote. As shown in FIG. 9, when the user has highlighted 136 a particular program (e.g. "Kiss the Girls"), and depresses the block button 44 on the remote, a blocking menu 134 is shown on the TV screen. The blocking menu includes much of the same information that would be available on an information screen of a typical programming guide interface. However, the blocking menu is configured so that the user may scroll through all the various criteria displayed in the blocking window and select the criteria in the blocking window which are then converted to blocking filters. Thus, in the example of FIG. 9, the user has highlighted the "R" rating and the words "serial killer." Using a remote 42, the user scrolls from word to word or identifier to identifier in the blocking window and hits enter when a particular identifier is highlighted. Thus, to select the R rating as a blocking filter, the user depresses the arrow keys to scroll over to the R which is highlighted and then depresses the enter key. To turn off the R rating blocking filter the user depresses R a second time. Upon depression of the enter key 106 on the remote, all future programming with an R rating or higher will be blocked for an identified user. After selection of a blocking filter, the application screen of FIG. 8, or one similar, is displayed to allow the master user to select which users to apply this blocking filter and when. Additionally, all programming that is associated with the phrase "serial killer" is blocked from all future viewing for the identified user. In the same manner the user may block particular stations, particular channels, particular programming titles, ratings, star-based rating systems, actors, topics and other criteria such as words or phrases used to describe the programming by way of the blocking window.

Figure 10:
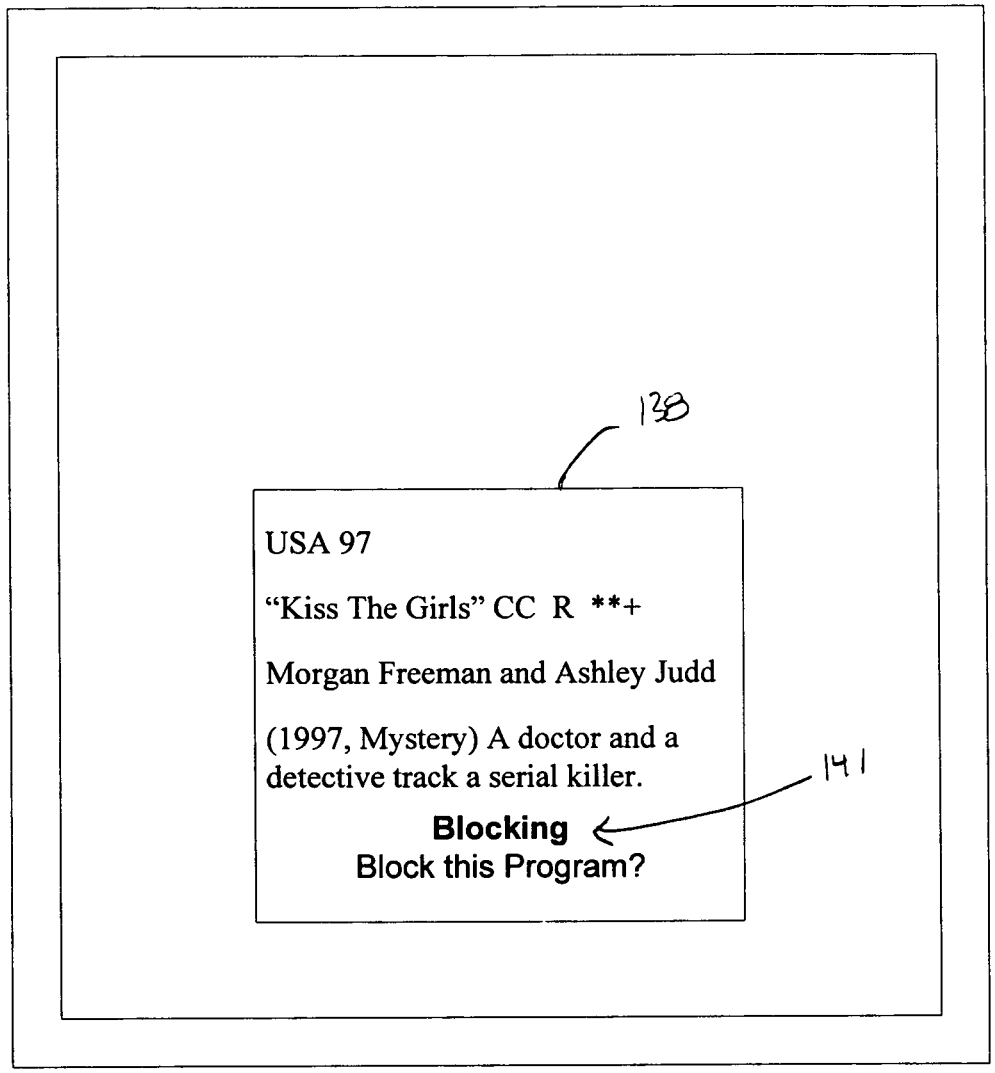
FIG. 10 is a diagram illustrating a second alternative of a program blocking activation screen, in accordance with aspects of the present invention.

FIG. 10 is another example of a blocking window 138. Unlike the blocking window of FIG. 9, which is displayed when the program guide 16 is active, the blocking window of FIG. 10 is displayed when a particular program is playing. This blocking window includes a shortcut 141 to block the particular program being viewed and all future instances of the programming by simply hitting the block button 44 while the program is being viewed and then depressing select or block when the blocking window is displayed. As with the blocking menu of FIG. 9, the user may also scroll through the various criteria associated with the window, highlight the criteria and hit the select or block button, which would then populate blocking filters for the particular identifier.

In some configurations of the present invention, the block button on the remote is configured for dual use. In such a configuration, the block button both sets the system in the blocking mode and then when a particular criteria is highlighted, the user depresses the block button rather than the select button to enable that blocking filter. By selecting the blocking button a second time when the blocking identifier is highlighted in the window, the blocking filter is disabled.

FIG. 11 illustrates an alternative implementation of the present invention including a limited play menu 142 that allows the master user to configure viewing characteristics (filters) rather than blocking filters. In such an implementation, selected viewing criteria are associated with that programming which is allowable (i.e., not blocked for a particular user). Such configuration is useful when a large majority of possible programming is blocked from viewing and very few programs are allowed by the user. Thus, for example, if a particular master user seeks to allow a particular user to only view the Discovery Channel, then the channel viewing criteria is set with the Discovery Channel. Thus, all other programming, but the Discovery Channel, is blocked from viewing for that particular user. The viewing criteria 144 are set up in much the same way as the blocking criteria and can include the same or different categories. Dropdown menus 146 allow a user to efficiently select various viewing criteria for each particular viewing criteria.

Figure 12:
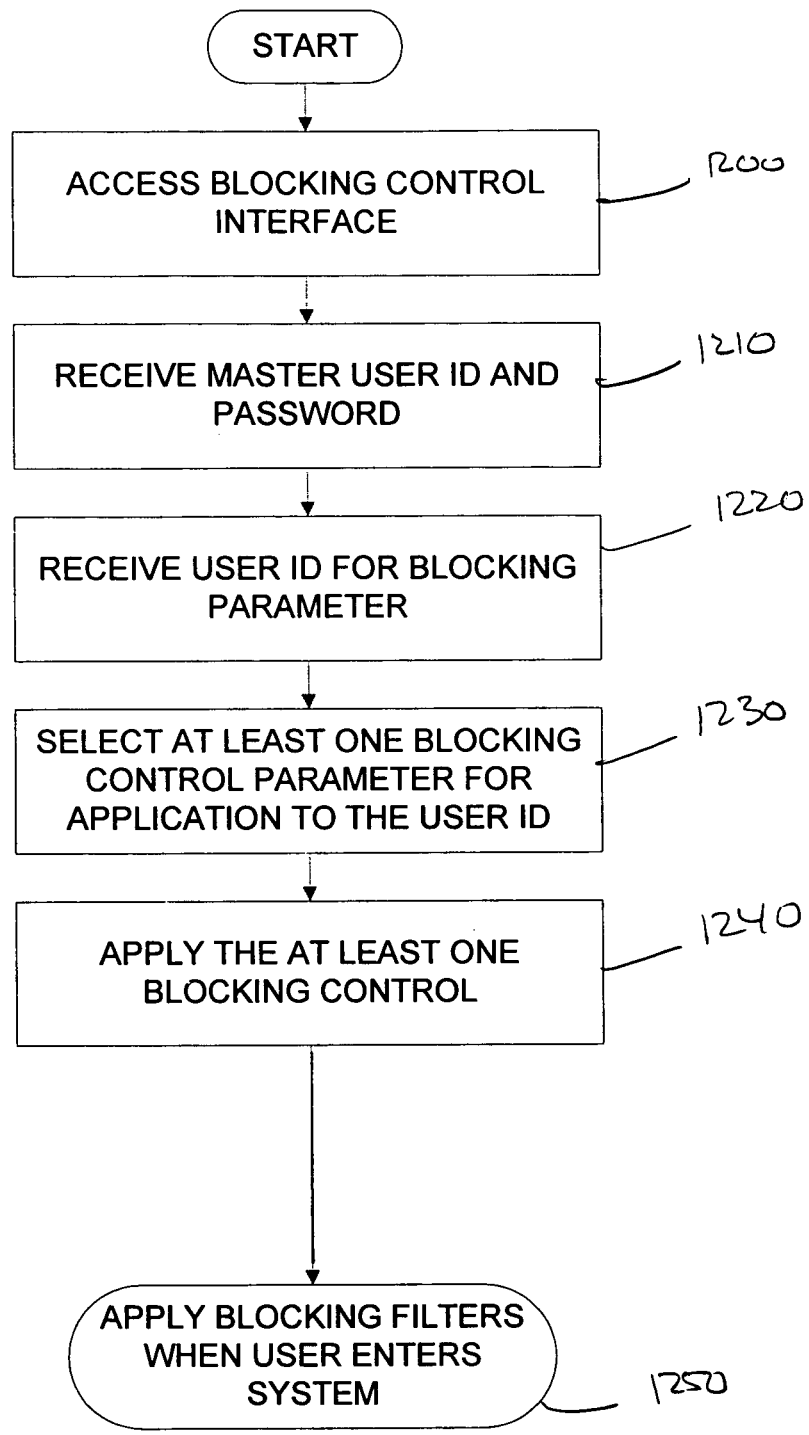
FIG. 12 is a flowchart illustrating a method for program blocking, in accordance with aspects of the present invention.

FIG. 12 is a flowchart illustrating particular operations that occur in one particular implementation of the present invention. First, a master user accesses a blocking control interface (operation 1200). The system recognizes a master user by way of a user ID and password (operation 1210). In some implementations of the present invention only the master user is provided access to the blocking control interface. Examples of the blocking control interface are discussed earlier and include the blocking filter menu of FIG. 7, the blocking application screen of FIG. 8, the blocking configuration menu of FIG. 9. Access to the blocking control menus can occur while a program is active, i.e., being displayed on the television, and when an onscreen programming guide is being displayed on the television. In one particular implementation of the present invention, the blocking control programs are accessed by depressing a block button on a remote which sends a block signal to the system to access the blocking menus. As mentioned above, when the block button is depressed, if a master user ID and password had not previously been received and a user ID and password had not previously been received then the system requests entry of a user ID and password. If the master user ID and matching password are entered then further blocking setup may occur.

If a non-master user ID and password are entered or the incorrect user ID and password are entered then blocking setup discontinues and regular programming goes on subject to any existing blocking that may occur (operation 1220). When the user ID and password are received, the master user may enter various blocking filters in various categories described herein (operation 1230). In one example, blocking filters are activated to dropdown menus in each of a plurality of blocking categories, such as is described in FIG. 7. In an alternative embodiment, various blocking filters in various blocking categories may be entered through a blocking menu such as is shown in FIG. 9. The examples of FIGS. 7 and 9 are merely illustrative of particular implementations of the present invention. Numerous possible configurations of onscreen menus and blocking filter definition-type implementations are possible. Moreover, various particular blocking filters discussed herein are set forth in various combinations. Other combinations, other blocking categories, and other blocking filter variations are possible.

When a blocking filter is established in a blocking category the system applies the blocking category to at least one user (operation 1240) to control program play. If multiple users have been defined in the system, then the master user may select which particular users to apply the blocking filter. The screen menu of FIG. 8 is one example of a particular implementation whereby a master user may select particular users to apply blocking filters. The screen is populated with users when the users are defined in the system. Further, the menu of FIG. 8 also provides a means by which the user may establish the frequency at which blocking filters are employed for a particular user. For example in FIG. 8 it is possible to configure systems so that blocking filters are applied in all possible instances on a daily, on a weekly, and on a monthly basis. Various configurations of the temporal blocking application screen of FIG. 8 may be employed. It is further possible to define particular days, particular weeks, particular months in which to apply blocking filters. These temporal applications may be done in combination with the start and end time filter and the day filter of FIG. 7 to further tailor temporal blocking.

After at least one filter is defined, regular viewing proceeds subject to blocking setup. If the master user continues viewing programs then no blocking will occur; however, should a new user activate the system, upon entry of the user ID and password, the system will allow programming subsequent to blocking filters. The master user may activate blocking for particular users, which blocking activation is stored in the system memory. Upon activation of the system, such as power on of a set-top box, the system will recognize that blocking has been enabled for at least one viewer and will request entry of a user ID and password. If the user ID and password matches that for which blocking has been enabled, then the system will allow viewing subject to program blocking (operation 1250).

Aspects of the present invention also involve method, apparatus, and systems to discriminate between and mute words for an audio or audio/video presentation that may be objectionable in one context and not objectionable in a different context, such as homonyms and heteronyms (hereafter "context specific words"). For example, the word "dam", when used to describe a barrier constructed across a waterway, would not be objectionable to most people, but the word "dam" when used to express anger or disappointment may be objectionable. As such, methods and apparatus conforming to the present invention can tailor muting based on a wide variety of contextual parameters, which may be employed alone or in combination, and may be employed in a logical AND or logical OR scenario. Further, such contextual tailoring, may be employed on a user-by-user basis, so that some user's are exposed to programming with different muting than other users. Such tailoring might be appropriate where a parent, for example, does not want his or her children exposed to words that may be offensive, regardless of any context specific use. For example, a parent may desire to mute all instances of the word "bitch," regardless of whether it is used derogatorily or used to refer to a female dog. In one particular implementation, discussed in further detail below, the context parameters by which muting discrimination occurs, are similar or the same to the blocking parameters discussed above.

Various applications and systems for muting objectionable words in an audio or audio/visual presentation exist or are described in the art. Some such muting platforms are described in pending U.S. patent application Ser. No. 09/694,873 titled "Multimedia Content Navigation and Playback" filed on Oct. 23, 2000, U.S. patent application Ser. No. 09/695,102 titled "Delivery of Navigation Data For Playback of Audio and Video Content" filed on Oct. 23, 2000, provisional application No. 60/561,851 titled "Apparatus, System, and Method for Filtering Objectionable Portions of an Audio Visual Presentation" filed on Apr. 12, 2004, and provisional application No. 60/497,769 titled "Method and Apparatus for Controlling Play of an Audio Signal" filed on Aug. 26, 2004, U.S. application Ser. No. 08/997,531 titled "Censoring Assembly Adapted for Use with Closed Caption Television Programming" filed Dec. 23, 1997 and now U.S. Pat. No. 6,075,550, issued Jun. 13, 2000, U.S. application Ser. No. 09/218,024 titled "Censoring Device to Censor Closed Captioning of Video Signal" filed on Dec. 22, 1998, and U.S. application Ser. No. 09/497,187 titled "Censoring Assembly Adapted for Use with Closed Caption Television Programming" filed on Feb. 3, 2000, all of which are hereby incorporated by reference herein.

In electronic, software, or combinations of the same, various particular implementations of the present invention may be tailored to any audio/video muting platform, such as those referenced immediately above, to discriminate between and mute words for an audio or audio/video presentation that may be objectionable in one context and not objectionable in a different context.

Figure 13:
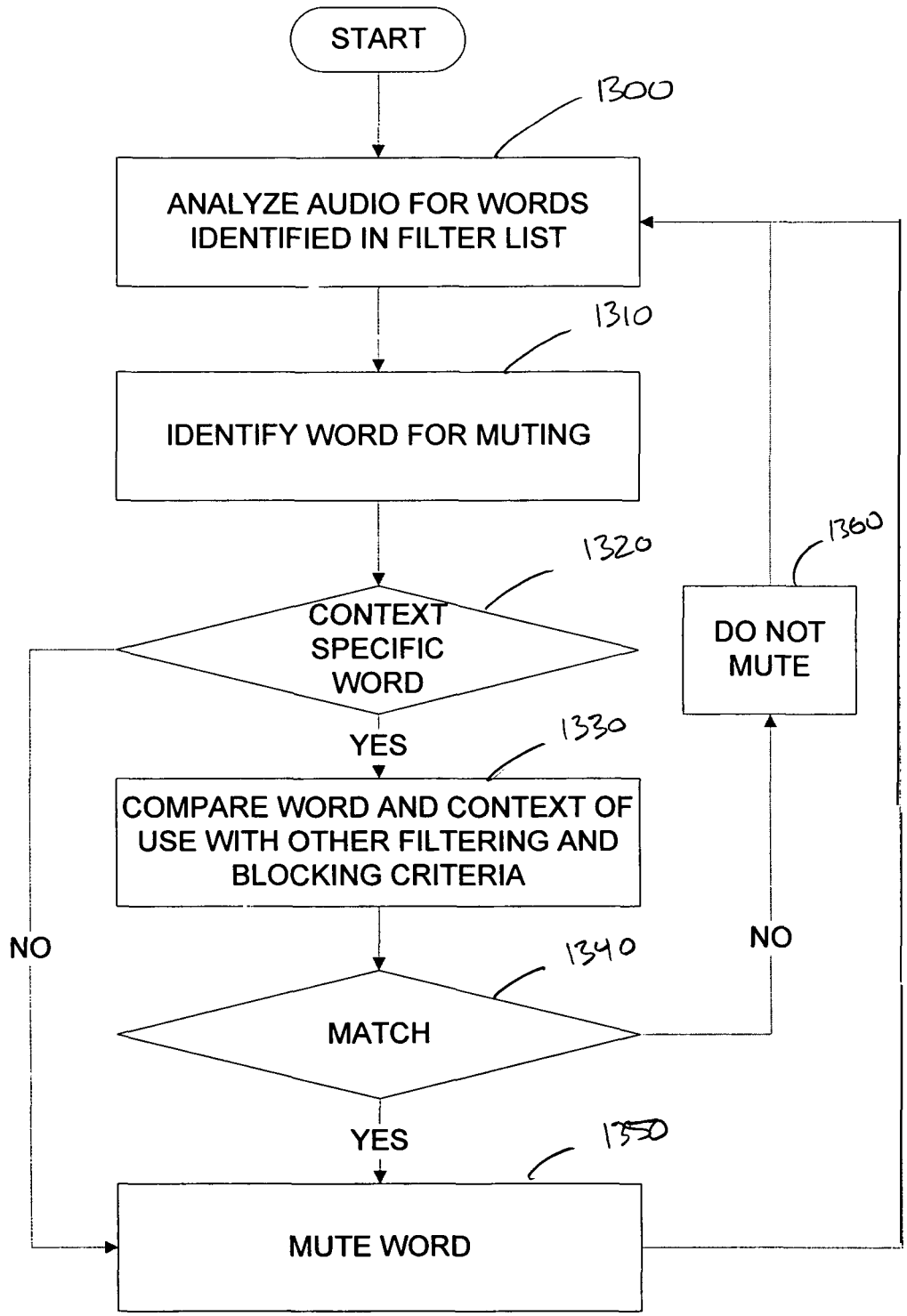
FIG. 13 is a flowchart illustrating a method for identifying context specific words for muting, and determining whether to mute such context specific words, in accordance with aspects of the present invention.
Figure 14:
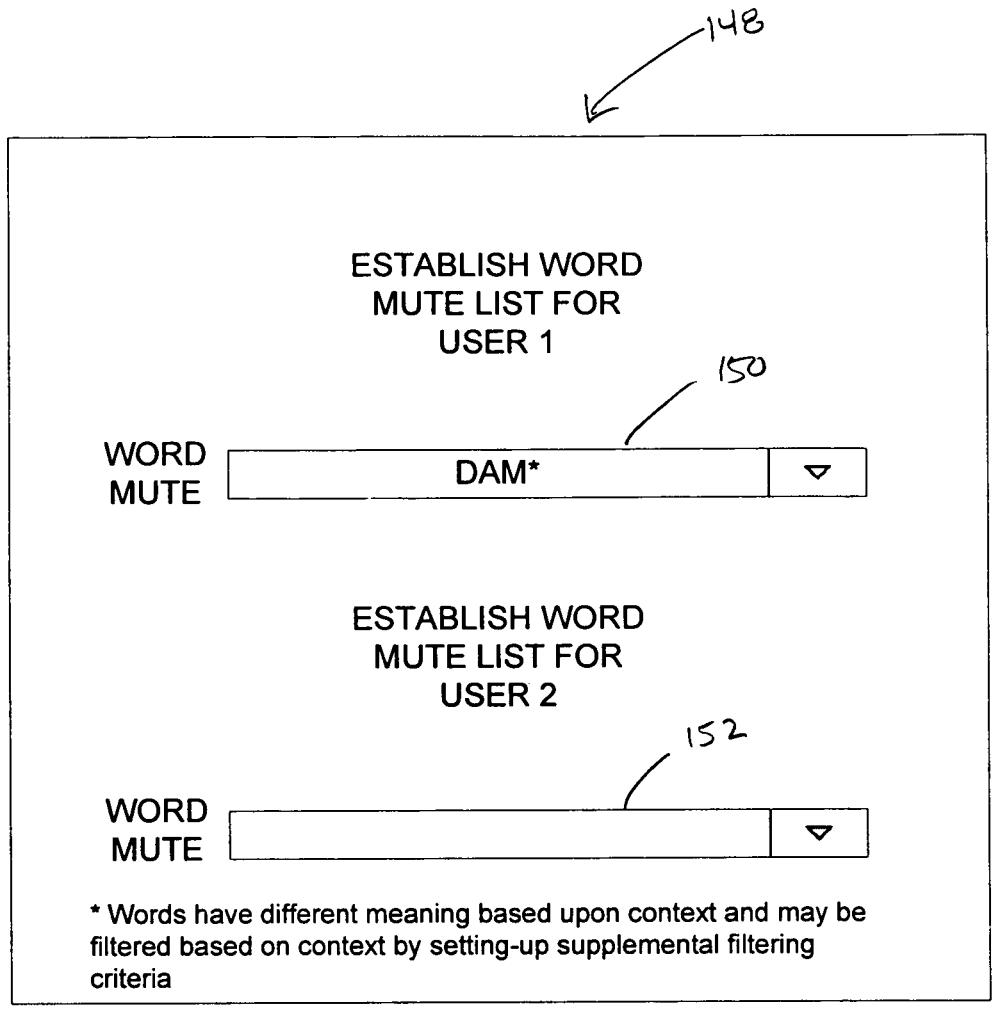
FIG. 14 is a diagram illustrating an input screen for establishing words for muting, in accordance with aspects of the present invention.

FIG. 13 is a flowchart illustrating one method conforming to particular aspects of the present invention. First, an audio stream for an audio or audio video presentation is analyzed for words identified in a filter list for muting (operation 1300). FIG. 14 illustrates an example of a user interface 148 adapted to establish words for muting by a user. In the example of FIG. 14, a master user selects one or more words from a dropdown menu 150 associated with a particular user of the system. Words are selected for muting from a dropdown menu with a list of all potentially objectionable words. The word list may be updated through the VBI, removable memory and other means. As with other blocking criteria discussed earlier, the user selects each word for muting by scrolling through the word with the arrow key on the remote and entering select. Context specific words are included in the list of all possible words that may be muted. A specialized remote may be employed, in such an instance, that would include a mute key 152 (see FIG. 6). The mute key, which may be a traditional mute key found on most remotes, is configured to select the word for prospective muting during later programming. Conventionally, the mute key causes instant muting of all audio and does not cause selected muting of only certain words in future audio. To deselect a particular word after it has been selected, the user scrolls to the word and hits select or mute a second time, which deselects the word from the filter list. To view a list for a particular user, the user may simply enter the screen of FIG. 14, and select the dropdown menu wherein all words for muting for each user are highlighted. Additionally, the system may be programmed in advance with muting categories containing groupings of words. By selecting a category, all words in the category are muted, subject to context specific muting discussed herein.

Referring again to FIG. 13, as the audio stream is analyzed for words to mute, a comparison is done against the mute list (operation 1310). As the audio plays, it is compared with the muting list, and, conventionally, when a word is identified in the audio that is also included in the muting list, then that particular word or the sentence associated with that word or some portion of the audio is muted. To determine if an audio sequence includes a word in a word muting list, the word muting list is compared to a close captioning stream associated with the program to determine whether a specified word in the muting list is used in the program. In accordance with aspects of the present invention, a further step occurs before actual muting occurs, and that is to determine whether the word identified for muting is a context specific type word (1320), and, if so, whether muting in this instance or context is appropriate (1330, 1340). Depending on the outcome, the word is muted (operation 1350) or not (operation 1360). The supplemental muting operation is generally performed by comparing a word identified for muting, with various programming criteria referred to as supplemental word muting selection.

It is possible that each word would have its own blocking criteria. However, it is also possible to pre-program the criteria for each word based on word logic, and the user interface would simply have a global option to turn Smart Muting™ on or off, which may be referred to as ClearPlay™ Smart Mute™ technology.

Figure 16:
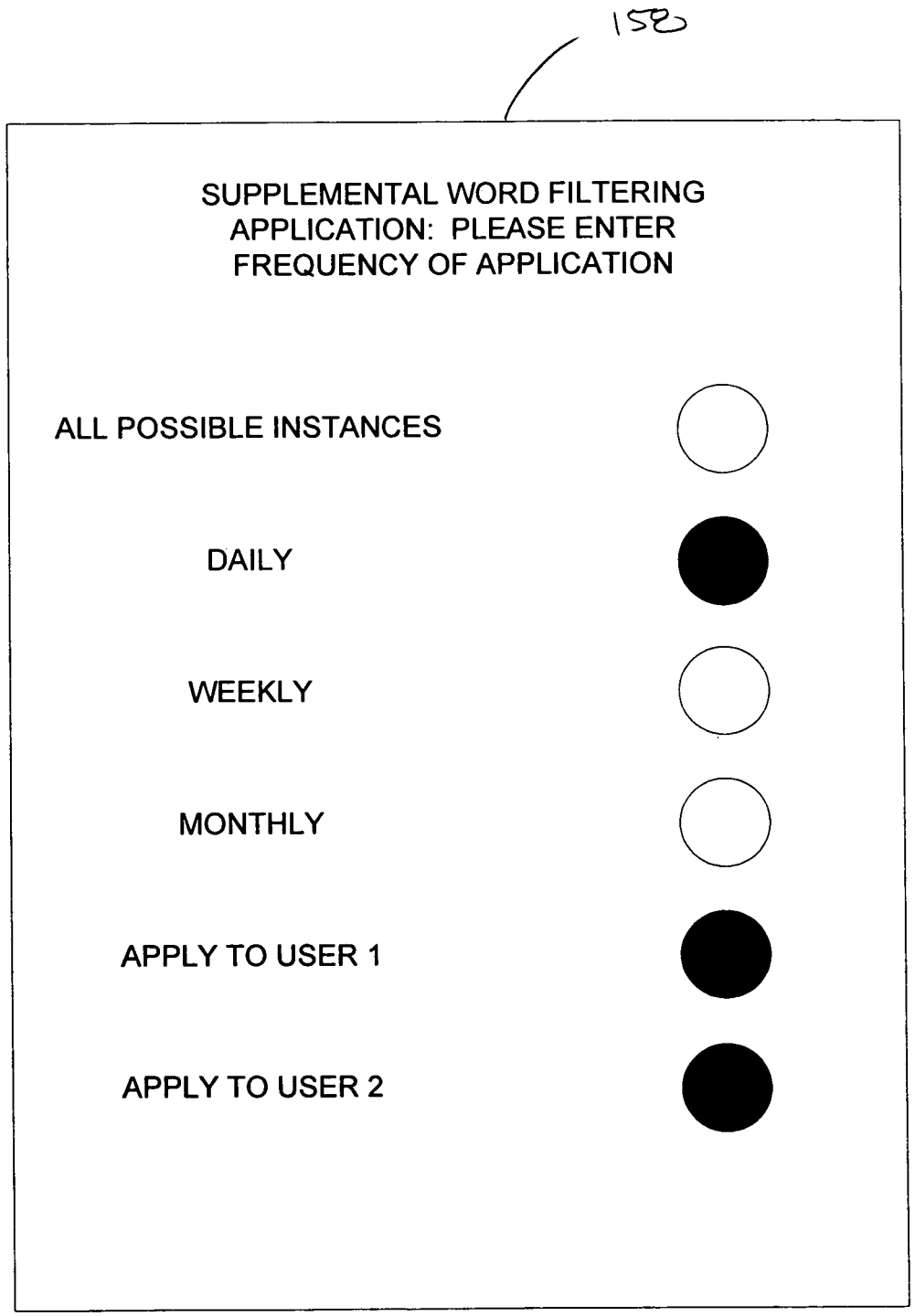
FIG. 16 is a diagram illustrating a temporal application menu for the supplemental word filtering application, in accordance with aspects of the present invention.

FIG. 15 illustrates one example of a context muting configuration menu 154 including a plurality of various supplemental word muting selections 156, and an associated user interface for defining the supplemental word muting selections. FIG. 16 is a second user interface 158 for establishing when to employ the supplemental word muting selection and to which user to employ them. Referring to FIG. 15, a plurality of supplemental word muting selections are shown, including: a start time 160, an end time 162, a channel 164, a program 166, a topic 168, an actor 170, a person 172, a rating 174, a day 176, and a blocking code 178 supplemental word muting selections. Many of the supplemental word muting selections are similar to the blocking selections discussed earlier. It is possible to employ the same or different criteria. The start and end time word muting selections (160,162) work in conjunction or individually, to determine whether a context specific word in the filter list should be muted. Generally speaking, if a context specific word occurs between the start and end time, then that word will be muted. If a context specific word occurs outside the time frame defined by the start and end time, then that word would not be muted. In the example of FIG. 15, the end time supplemental word muting selection is populated with "after 9:00 PM". Thus, after 9:00 p.m., any word identified in the mute list that is a context specific type word, is muted. Before 9:00 p.m. muting does not occur.

The channel supplemental word muting selection 164, tailors muting to a particular channel. For example, the use of the word "damn" by the Discovery Channel is not muted, but the use of the word "damn" on "all movie channels" is muted. Each of the supplemental word muting selections are associated with a dropdown menu 180 providing selectable lists of all possible selections. The dropdown menus further include a "mute" or "don't mute" button 182, so that a particular filter can be used to cause context specific word filtering or not cause context specific word filtering.

The program supplemental word muting selection category 160 allows a user to tailor muting on a program specific basis. Thus, for example, when the word "damn" is used in a program identified in a program supplemental word muting selection, then the word "damn" would be muted. Other uses of the word damn in programs not identified would be allowed. In an alternative implementation, selected program supplemental word muting selections illustrate those programs for which muting will not occur, which, depending on the word usage and the number of programs may provide a more efficient vehicle by which the master user can set up supplemental word muting selections.

The topic supplemental word muting selection 168 allows a user to tailor specific context word muting based upon the program topic in which the word occurs. Topics include mystery, adult, action, horror, and the like. As with a program, topical supplemental word muting may be configured so that topics identified in a supplemental word muting selection cause muting, or topics identified in the supplemental word muting selection do not cause muting. Thus, for example, if the topic is history and is selected as a supplemental word muting selection then muting may not occur depending on the configuration. The actor, person, rating, day, and blocking code supplemental word muting selections (170, 172, 174, 176, and 178) proceed in a similar manner. Thus, depending on which particular supplemental word muting selections are activated, then context specific word muting will proceed accordingly. For example, in the actor supplemental word muting selection, the actor Howard Stern is selected. Further, the actor selection is configured as a mute. Thus, in any program identified or associated with Howard Stern, dual context words will be muted. Should the user have selected un-mute, then any program with Howard Stern would not result in muting of dual context words. If no supplemental word muting selections are activated, then all dual context use words are muted independent of any particular context in which the word occurs.

Figure 17:
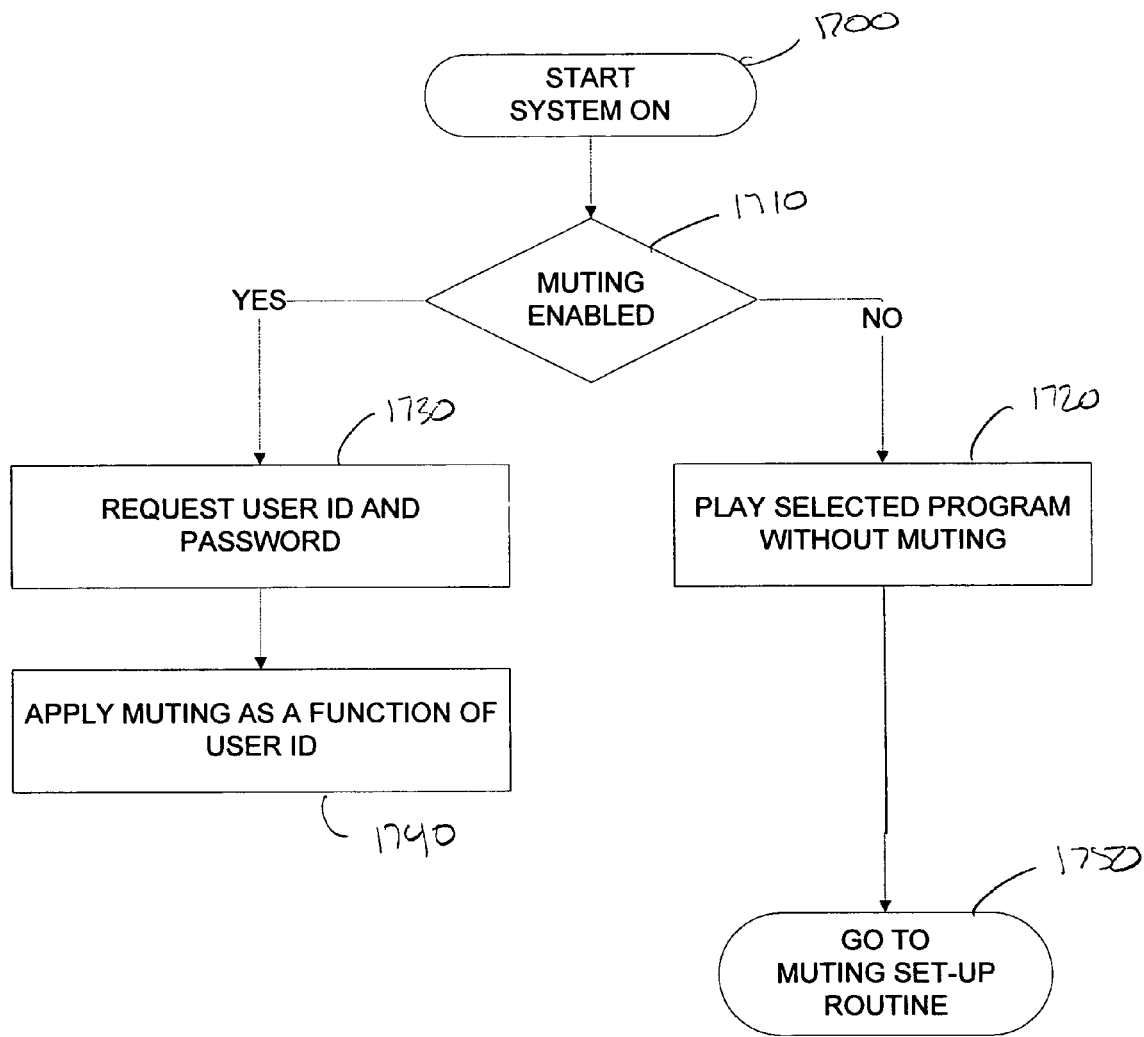
FIG. 17 is a flowchart illustrating a method for muting dual context use specific words.

FIG. 17 is a flowchart illustrating a method for context specific word muting, in accordance with aspects of the present invention. Upon system startup (operation 1700), the system determines whether muting has been enabled (operation 1710). Muting may be preset by the master user so that it is always enabled, or may be activated during viewing. If muting is not enabled, then a selected program is played without muting (operation 1720). If muting has been enabled, then the system will request a user ID and password (operation 1730). The user ID and password will provide information for the system to determine which muting filters to apply, i.e., depending on the particular user activating the system, and will also determine if any program blocking should be applied, in a system employing both a program blocking and a dual context use muting configuration. Muting will then proceed as a function of the user ID (operation 1740). Further, dual context use muting will also proceed as a function of user ID.

An embodiment of the present invention may include a remote configured with a muting setup button. Upon depression of the muting setup button, activation of the muting setup procedure will occur (operation 1750). Such muting setup will proceed in the manner similar to the program blocking setup including requesting a user ID and password and future application of the muting criteria as a function of user ID. If a proper master user ID and password are received then a word mute list, such as shown in FIG. 14, will be displayed. Further, after the particular words for muting are identified, a display such as shown in FIG. 15 will be presented on the monitor. After the user has completed supplemental word muting selection, then the supplemental word filtering application of FIG. 16 will be shown. Upon completion of the setup of the screen of FIG. 16, playback will proceed with the muting and context use specific word filtering employed.

Aspects of the present invention may be employed in audio/video programming signals received from any distribution medium including, but not limited to, cable distribution mediums, satellite distribution mediums, computer network distribution mediums, broadcast distribution medium. The medium may be characterized as digital or analog, or combinations thereof, depending on any particular distribution arrangement. Further, the audio/video signal may be transmitted from a storage medium, such as a DVD, CD-ROM, video disc, tape, or the like. The methods and menus discussed herein and the blocking arrangements discussed herein may be implemented in hardware or in one or more processors adapted specifically to operate in accordance with the various embodiments discussed herein. The processor may be a stand-alone processor, or may be a processor further adapted to perform various other programming display operations. For example, one or more processors in the cable or satellite set-top box, or in a personal video recorder, or other signal processing platform, may include specific code and operating instructions arranged in accordance with aspects and embodiments of the invention discussed herein.

Particular embodiments of the present invention may be deployed in the context of computer-executable instructions, such as program modules, being executed on a processor. Program modules may include routines, programs, objects, components, data structures, etc. that perform particular tasks or implement particular abstract data types. Computer-executable instructions, associated data structures, and program modules represent examples of program code means for executing step of the methods and selection menus related thereto disclosed herein. The particular sequence of any operations of a particular method, the appearance and particular arrangement of categories and filters in a particular menu or context specific word selection menu or arrangement, and any executable instructions, data structures, or the like may be performed in various orders, combinations, etc.

Blocking filters and selections relating thereto, muting word lists and selections related thereto, and the like may be stored in memory of the particular processing platform arranged in accordance with aspects of the present invention. It is also possible, to store such blocking filters and selections related thereto, muting word lists and selections relating thereto, and the like at a location remote from the processing platform, so long as a network connection or other data connection exists with the processing platform. Aspects of the present invention are applicable to all types of programming, whether commercial or subscription, and irrespective of the distribution medium, including news, entertainment, sit-com, movie, informational, reality, advertising, sports, talk, adventure, travel, weather, history, self-help, buying, pay-per-view, shopping, spiritual, live, drama, children's, music (with or without images), health, fitness, game, and other programming.

For any embodiment, the user settings may be sent to a server associated with the user account. (i.e. send information that specifies that this user account wants to block all instances of this program). The user information could be sent to the server via modem/network/cable/etc. The server can then profile all upcoming programs and pre-determine which programs the user wants to block based on their blocking criteria. The server can prepare a new programming guide unique to the user that specifies which programs are going to be blocked, and then set the customized programming guide to the user device via modem/network/wireless/cable/etc. The customized program guide could have a "blocked" flag associated with the particular program, and the device will behave according to the flag (so it doesn't need to process all the blocking criteria at the client level—where processing might be limited). The onscreen programming guide interface can also display that the program will be blocked based on the block flag, but not allow play of the blocked program.

What I claim is:

1. A method for blocking one or more programs amongst a plurality of programming options, the method comprising:
receiving an audio/video programming signal comprising a plurality of programs, wherein each program is associated with an audio signal;
receiving an indication of at least one blocking word;
receiving an indication to block viewing of an entire program containing the at least one blocking word in the audio signal associated with any of the plurality of programs; and
blocking display of any of the plurality of programs corresponding with an audio signal including the at least one blocking word.

2. The method of claim 1 further comprising the operation of:
analyzing a close captioning stream associated with the audio signal to determine whether the at least one blocking word is used in the program.

3. The method of claim 1 further comprising the operation of:
receiving an indication of at least one blocking word by way of means for establishing at least one blocking word filter.

4. An processor apparatus for blocking one or more programs amongst a plurality of programming options, the processor apparatus arranged to perform the operations of claim 1.

5. The processor of claim 4 selected from the group comprising: a cable-set top box processor, a satellite set-top box processor, a television processor, an audio receiver processor, and a personal video recorder processor.

6. A method of muting a word in a program audio signal comprising:
identifying a word in the audio signal for muting, the word having a first meaning and a second meaning, wherein the first meaning of the word is indicated as being objectionable to a viewer of a program and the second meaning of the word is indicated as being not objectionable to the viewer;
identifying at least one program characteristic of the program indicative of context of use of the word such that context would suggest the first meaning or the second meaning;
muting the particular word when it is associated with the first meaning as a function of whether the word is used in a program having the at least one characteristic; and
not muting the particular word when it is associated with the second meaning.

7. The method of claim 6 further comprising the operation of:
identifying a word in the audio signal for muting, the word having a first meaning and a second meaning, the first and second meanings being a function of the context of use of the word.

8. The method of claim 6 wherein the at least one program characteristic of the program includes a start time of the program.

9. The method of claim 6 wherein the at least one program characteristic of the program includes an end time of the program.

10. The method of claim 6 wherein the at least one program characteristic of the program includes a channel associated with the program.

11. The method of claim 6 wherein the at least one program characteristic of the program includes at least one word of the program title.

12. The method of claim 6 wherein the at least one program characteristic of the program includes a topic associated with the program.

13. The method of claim 6 wherein the at least one program characteristic of the program includes information text associated with the program.

14. The method of claim 6 wherein the at least one program characteristic of the program includes a person associated with the program.

15. The method of claim 6 wherein the at least one program characteristic of the program includes a rating of the program.

16. The method of claim 6 wherein the at least one program characteristic of the program includes a day that the program is scheduled for availability.

17. The method of claim 6 wherein the at least one program characteristic of the program includes a word used in an audio signal associated with the program.

18. The method of claim 6 wherein the at least one program characteristic of the program includes a closed captioning availability indicator associated with the program.

19. The method of claim 6 wherein the at least one program characteristic of the program includes a stars rating for the program.

\* \* \* \* \*